(12) United States Patent
Day et al.

(10) Patent No.: US 12,099,024 B2
(45) Date of Patent: Sep. 24, 2024

(54) METHODS AND APPARATUS FOR ELECTRON BACKSCATTER DIFFRACTION SAMPLE CHARACTERISATION

(71) Applicants: VG SYSTEMS LIMITED, Altrincham (GB); FEI Company, Hillsboro, OR (US)

(72) Inventors: Austin Penrose Day, Clearwell (GB); Christopher James Stephens, West Sussex (GB); Pavel Stejskal, Brno (CZ); Martin Petrek, Brno (CZ)

(73) Assignees: FEI Company, Hillsboro, OR (US); VG Systems Limited, Chesire (GB)

( * ) Notice: Subject to any disclaimer, the term of this patent is extended or adjusted under 35 U.S.C. 154(b) by 221 days.

(21) Appl. No.: 17/427,791

(22) PCT Filed: Mar. 3, 2020

(86) PCT No.: PCT/EP2020/055588
§ 371 (c)(1),
(2) Date: Aug. 2, 2021

(87) PCT Pub. No.: WO2020/178296
PCT Pub. Date: Sep. 10, 2020

(65) Prior Publication Data
US 2022/0136985 A1 May 5, 2022

(30) Foreign Application Priority Data
Mar. 4, 2019 (EP) .................................. 19160632

(51) Int. Cl.
*G01N 23/203* (2006.01)

(52) U.S. Cl.
CPC ... *G01N 23/203* (2013.01); *G01N 2223/0566* (2013.01); *G01N 2223/40* (2013.01)

(58) Field of Classification Search
CPC ......... G01N 23/203; G01N 2223/0566; G01N 2223/40
See application file for complete search history.

(56) References Cited

U.S. PATENT DOCUMENTS

2016/0123907 A1  5/2016  Li et al.

OTHER PUBLICATIONS

Foden et al., "Indexing electron backscatter diffraction patterns with a refined template matching approach", Ultramicroscopy 207 (2019), 112845.

(Continued)

*Primary Examiner* — Nicole M Ippolito
*Assistant Examiner* — Hanway Chang
(74) *Attorney, Agent, or Firm* — Thomas F. Cooney

(57) ABSTRACT

A method of analyzing a sample imaged by electron backscatter diffraction. The method comprises identifying a plurality of Kikuchi bands in an electron backscatter diffraction image of a position on the sample. The method further comprises forming, for each identified Kikuchi band, a respective vector representation of said Kikuchi band based at least in part on an estimate of the position on the sample. A configuration of the sample is determined by identifying a particular set of expected vector representations from a plurality of sets of expected vector representations as matching the vector representations of the plurality of identified Kikuchi bands.

20 Claims, 15 Drawing Sheets

(56) References Cited

OTHER PUBLICATIONS

Schwarzer, "Crystallography and Microstructure of Thin Films Studied by X-Ray and Electron Diffraction", Materials Science Forum, vol. 287-288, pp. 23-60.

Wilkinson et al., "Applications of multivariate statistical methods and simulation libraries to analysis of electron backscatter diffraction and transmission Kikuchi diffraction datasets", Ultramicroscopy 196 (2019), pp. 88-98.

Zeng Yi, Wu Wei, Liu Ziwel. 2015. Research in Application Technology of Low-Voltage Scanning Electron Microscope, pp. 208-209. Shanghai Science and Technology Press, Shanghai, China. (in Chinese, with appended English translation).

"Application of Electron Backscatter Diffraction Technology in Silicate Crystal Chemistry." In Crystal Chemistry of Silicate, edited by Tian Jian, pp. 249-253. Luojiashan, Wuchang, China: Wuhan University Press, 2010. (in Chinese, with appended English translation).

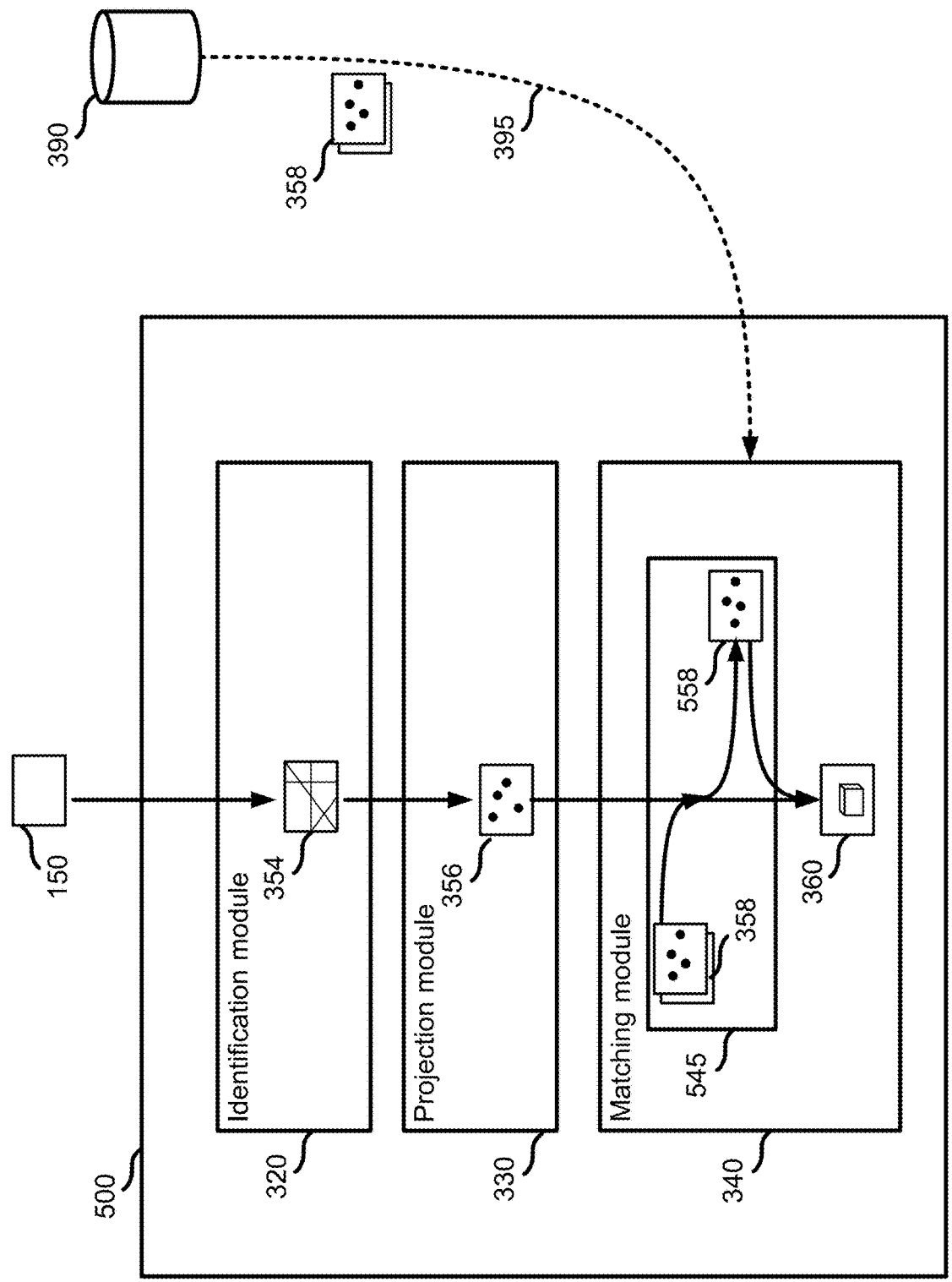

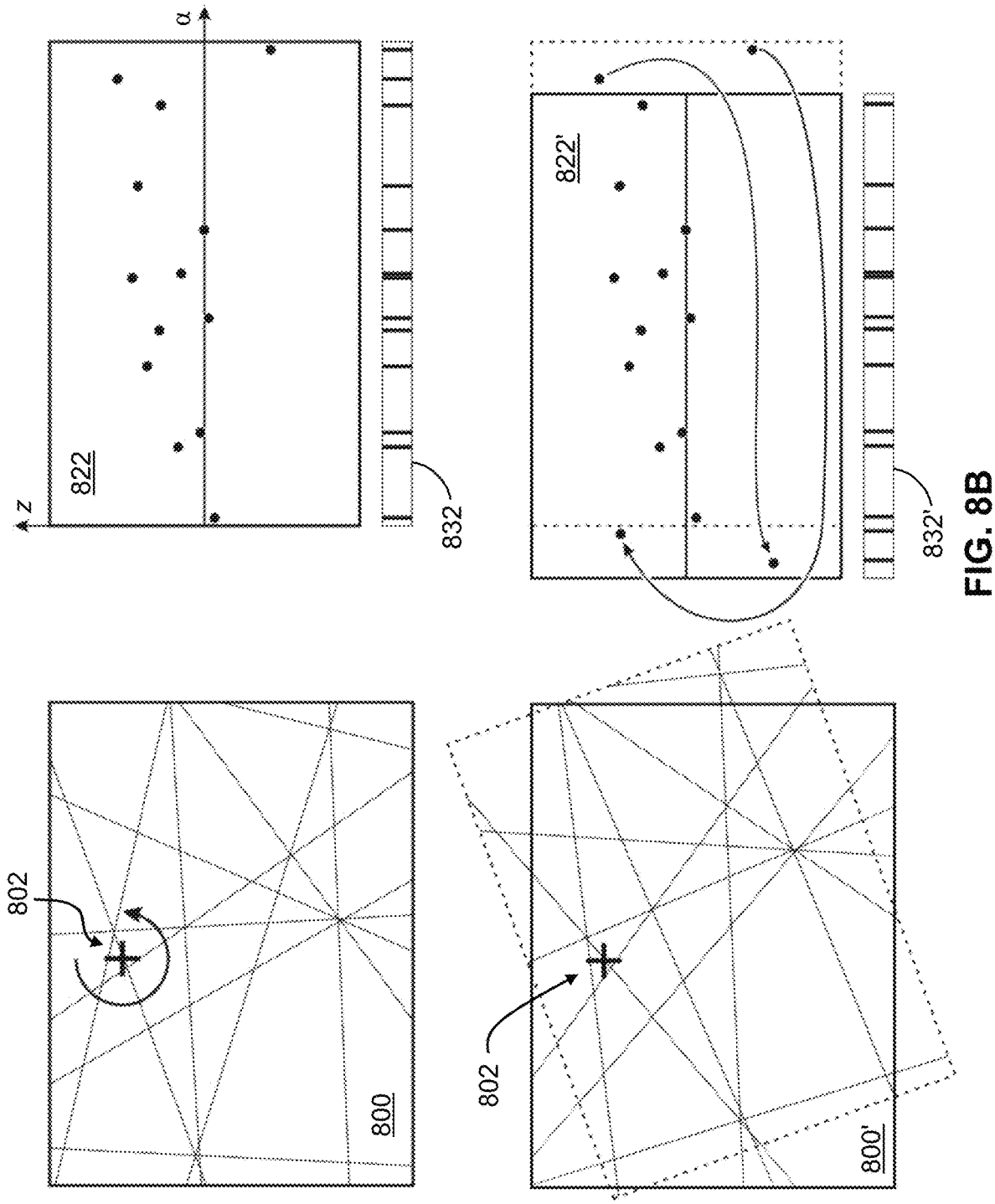

METHODS AND APPARATUS FOR ELECTRON BACKSCATTER DIFFRACTION SAMPLE CHARACTERISATION

CROSS REFERENCE TO RELATED APPLICATIONS

This application is the United States National Stage of international application No. PCT/EP2020/055588 having international filing date Mar. 3, 2020, which claims priority to and the benefit of the filing date of European application No. 19160632.6 (now abandoned) which was filed on Mar. 4, 2019, the disclosures of both applications hereby incorporated by reference in their entirety.

FIELD OF THE INVENTION

The present invention relates to characterisation of a sample using electron backscatter diffraction, in particular the analysis of an electron backscatter diffraction image, for example to determine properties of the sample.

BACKGROUND OF THE INVENTION

Electron Backscatter Diffraction (EBSD) is a widely used technique for characterising material samples. EBSD allows for a multitude of crystallographic, microstructural and microtextural properties to be determined for specific portions of or positions on a sample surface. The most common EBSD applications include crystal orientation image mapping (OIM) to measure microstructure, phase analysis, and high-resolution EBSP cross-correlation for strain analysis. In this way EBSD has proved an effective tool for characterising polycrystalline and/or multi-phase materials. In particular many important properties, such as grain size and shape, phase distribution, local deformation, and so on, may be measured or estimated using EBSD. By performing EBSD for multiple points on a sample surface a detailed picture of the nature and composition of polycrystalline and/or multi-phase materials may be produced. Such characterisation can have a multitude of uses, including failure analysis of components, along with quality assurance and control during industrial manufacture, all the way to primary research into materials and material structure under various conditions.

During an EBSD analysis, a beam of electrons, typically from an electron microscope, is directed onto a sample in a vacuum chamber. The electrons are diffracted from crystal planes within the sample, to produce a series of overlapping "bright" bands which form an electron backscatter diffraction pattern. A portion of the scattered (diffracted) electrons from the sample strike a screen (typically a phosphor screen) or imaging sensor (e.g. CMOS or CCD). The electrons collide with the phosphor screen which fluoresces and the resulting light may be detected using a lens assembly and a camera; or the electrons can be directly detected by the sensor. In either case the diffraction pattern is converted in to a digital signal which measures the angular distribution of electrons.

The resulting image produced by the EBSD technique (often termed an Electron Backscatter Pattern, EBSP) typically comprises of a number of intersecting bands defined by a pair of (substantially parallel) edges. These are known as Kikuchi bands, and it is usually on the basis of these bands that the material sample is characterised. In particular, Kikuchi bands identified in the resulting image are typically matched to known Kikuchi bands in a process known as indexing. This is typically done by comparing intersection angles of pairs of identified Kikuchi bands with theoretical lists of known angles for known materials—typically calculated based on the interplanar angles of a theoretical crystal model.

A number of approaches aimed at automating this indexing process are currently employed in the field. These schemes often involve using a Hough transform to first identify a number of Kikuchi bands present in an EBSD image, and using look-up tables of interplanar angles (or, less commonly, interzonal angles) to index some of the identified Kikuchi bands (see for example "Individual Lattice Orientation Measurements Development and Application of a Fully Automatic Technique, Stuart I. Wright, Ph.D. Thesis, Yale University, USA, 1992.). However, with EBSD images often containing tens of Kikuchi bands and attempting to fit all of the angles of intersection for all of the Kikuchi bands at once can become unmanageable. This is usually due to the number of interplanar angle combinations increasing as the square of the number of bands. As such, automatic indexing techniques often attempt to fit only around 3 intersection angles at a time. As the intersection angles are subject to measurement error in the EBSD process such limited automatic indexing may miss correct indexing solutions. This can often be the case should one of the initial 3 intersection angles happen to contain a significant measurement error or is from an erroneously detected Kikuchi band, i.e. one that is not really present in the diffraction pattern. This can lead to incorrect or inaccurate results.

Added to this, automatic indexing systems often require external knowledge of the local chemistry of the sample, or likely phases or lattice types in order to reduce the number of possible interplanar angles to be tested against. This introduces bias into the characterisation of the sample that can also lead to incorrect or inaccurate results.

SUMMARY OF THE INVENTION

It is an aim of the invention to provide an improved system for characterisation of a sample using electron backscatter diffraction, in particular, improvements to the accuracy of automatic analysis of images produced by electron backscatter diffraction. As such, embodiments of the invention seek to address the above described problems and other of the related prior-art.

In a first aspect there is provided a method (such as a computer implemented method) of analyzing a sample imaged by (or mapped by or otherwise having undergone) electron backscatter diffraction. The method comprises identifying a plurality of Kikuchi bands in an electron backscatter diffraction image (or map or output) of a position on the sample. For each identified Kikuchi band, a respective vector representation of said Kikuchi band is formed. Each respective vector is based at least in part on an estimate of the position on the sample.

The method continues with determining a configuration of the sample by identifying a particular set of expected vector representations from a plurality of sets of expected vector representations as matching the vector representations of the plurality of identified Kikuchi bands.

In some embodiments determining a configuration further comprises obtaining a number of candidate sets of expected vector representations from the plurality of sets of expected vector representations by matching the angles of the vector representations, relative to a pre-determined co-ordinate axis, with the corresponding angles of the expected vector representations. The particular set of expected vector representations that matches the vector representations of the plurality of identified Kikuchi bands may then be identified from the number of candidate sets of expected vector representations.

In some embodiments the plurality of expected sets of vector representations comprise one or more master sets of vector representations. For each master set of vector representations the plurality of expected sets vector representations comprise one or more rotated sets of expected vectors generated by applying a respective rotation equivalent to applying rotation about the pre-determined co-ordinate axis followed by a rotation about a further co-ordinate axis. Said determining may further comprise identifying a rotation which matches the particular set of expected vector representations with the vector representations of the plurality of identified Kikuchi bands.

In a second aspect there is provided a method (such as a computer implemented method) of analyzing a sample imaged by (or mapped by or otherwise having undergone) electron backscatter diffraction. The method comprises identifying a plurality of Kikuchi bands in an electron backscatter diffraction image (or map or output) of a position on the sample. For each identified Kikuchi band, a respective point is formed. Each point corresponds to the intersection between: a vector representation of said Kikuchi band, and a cylindrically symmetrical surface (such as a cylindrical surface). The vector representation of said Kikuchi band and the cylindrical axis of the surface are both determined based at least in part on an estimate of the position on the sample.

The method continues with determining a configuration of the sample by identifying a particular set of expected points from a plurality of sets of expected points as matching the points of the plurality of identified Kikuchi bands. For example, a point may be matched with an expected point when an overlap calculated between a distribution (such as a Gaussian distribution) centered on the point with a distribution centered on the expected point exceeds a pre-determined threshold. The characteristic widths of the distributions may be based on the intensities of the corresponding points.

This aspect may advantageously provide improved accuracy when matching experimentally produced Kikuchi bands of a sample with expected Kikuchi bands. In particular, this aspect may enable many more Kikuchi bands to be matched, more efficiently, than in prior art methods. As a consequence the accuracy or confidence of the resulting configuration for the sample may be improved.

In some embodiments of the first and second aspects the determined configuration comprises any one or more of: a crystalline phase in the sample; the unit cell dimensions of a crystal in the sample; the atoms in the cell of a crystal in the sample; a lattice orientation in the sample; a local lattice deformation present in the sample; strain state.

In some embodiments, the method further comprises obtaining the plurality of sets of expected points. Each set of expected points correspond to a respective known sample. For each known sample the expected points correspond to intersections between vector representations of Kikuchi bands of said known sample and a further cylindrically symmetrical surface (such as a cylindrical surface). The further cylindrically symmetrical surface may be the same as the initial cylindrical surface. The Kikuchi bands of one or more of the known samples may be identified from simulated and/or experimental EBSD images.

The determined configuration is based on one or more properties of a particular known sample corresponding to the particular set of expected points matched with the points of the plurality of identified Kikuchi bands.

In some embodiments of the first and second aspects the vector representation of each respective Kikuchi band is determined based on a plane defined by the Kikuchi band. Typically, the vector representation of the respective Kikuchi band is based on a normal vector of the plane defined by the Kikuchi band.

In some embodiments the step of determining a configuration further comprises obtaining a number of candidate sets of expected points from the plurality of sets of expected points. Such obtaining may be carried out by matching the relative azimuthal angles of the points with the relative azimuthal angles of the expected points. Here, the particular set of expected points that matches the points of the plurality of identified Kikuchi bands is identified from the number of candidate sets of expected points.

In some embodiments the step of determining a configuration further comprises, for each of two or more sets of expected points from the plurality of sets of expected points, optimizing the estimate of the position on the sample based on said set of expected points, and identifying one of the two or more sets of expected points as the particular set of expected points based at least in part on the optimized estimates of the position on the sample.

In some embodiments the step of identifying a particular set of expected points from a plurality of sets of expected points as matching the points of the plurality of identified Kikuchi bands is carried out by way of the following steps.

plotting, in a first image, distributions centered on each point of the points of the plurality of identified Kikuchi bands;

obtaining a second image comprising, for each point of the particular set of expected points, a distribution centered on said point.

Here a particular set of expected points from a plurality of sets of expected points is identified as matching the points of the plurality of identified Kikuchi bands based on the intersection of the first and second images.

The invention also provides apparatus corresponding to, and comprising elements, modules or components arranged to put into effect the above methods, for example one or more various suitably configured computing devices such as those described below.

In particular the invention therefore provides a first system for analyzing a sample imaged by (or mapped by or otherwise having undergone) electron backscatter diffraction. The system comprises an identification module configure to identify a plurality of Kikuchi bands in an electron backscatter diffraction image of a position on the sample. The system also comprises a projection module configured to, for each identified Kikuchi band, form a respective vector representation of said Kikuchi band based at least in part on an estimate of the position on the sample.

The system also comprises a matching module configured to determine a configuration of the sample by identifying a particular set of expected vector representations from a plurality of sets of expected vector representations as matching the vector representations of the plurality of identified Kikuchi bands.

A second system corresponding to the second aspect outlined above may also be provided. The second system comprises an identification module configured to identify a plurality of Kikuchi bands in an electron backscatter diffraction image (or map or output) of a position on the sample. The second system also comprises a projection module configured to, for each identified Kikuchi band, form a respective point. Each point corresponds to the intersection between: a vector representation of said Kikuchi band, and a cylindrically symmetrical surface (such as a cylindrical surface). The vector representation of said Kikuchi band and the cylindrical axis of the surface are both determined based at least in part on an estimate of the position on the sample.

The second system also comprises a matching module configured to determine a configuration of the sample by identifying a particular set of expected points from a plurality of sets of expected points as matching the points of the plurality of identified Kikuchi bands. For example, a point may be matched with an expected point when an overlap calculated between a distribution (such as a Gaussian distribution) centered on the point with a distribution centered on the expected point exceeds a pre-determined threshold. The characteristic widths of the distributions may be based on the intensities of the corresponding points.

The invention also provides one or more computer programs suitable for execution by one or more processors, such computer program(s) being arranged to put into effect the methods outlined above and described herein. The invention also provides one or more computer readable media, and/or data signals carried over a network, which comprise (or store thereon) such one or more computer programs.

BRIEF DESCRIPTION OF THE DRAWINGS

Embodiments of the invention will now be described, by way of example only, with reference to the accompanying drawings, in which:

FIG. 8B shows an example EBSD image and the effect that rotation of the diffraction pattern about the pattern centre has on a vector representation of the Kikuchi bands.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
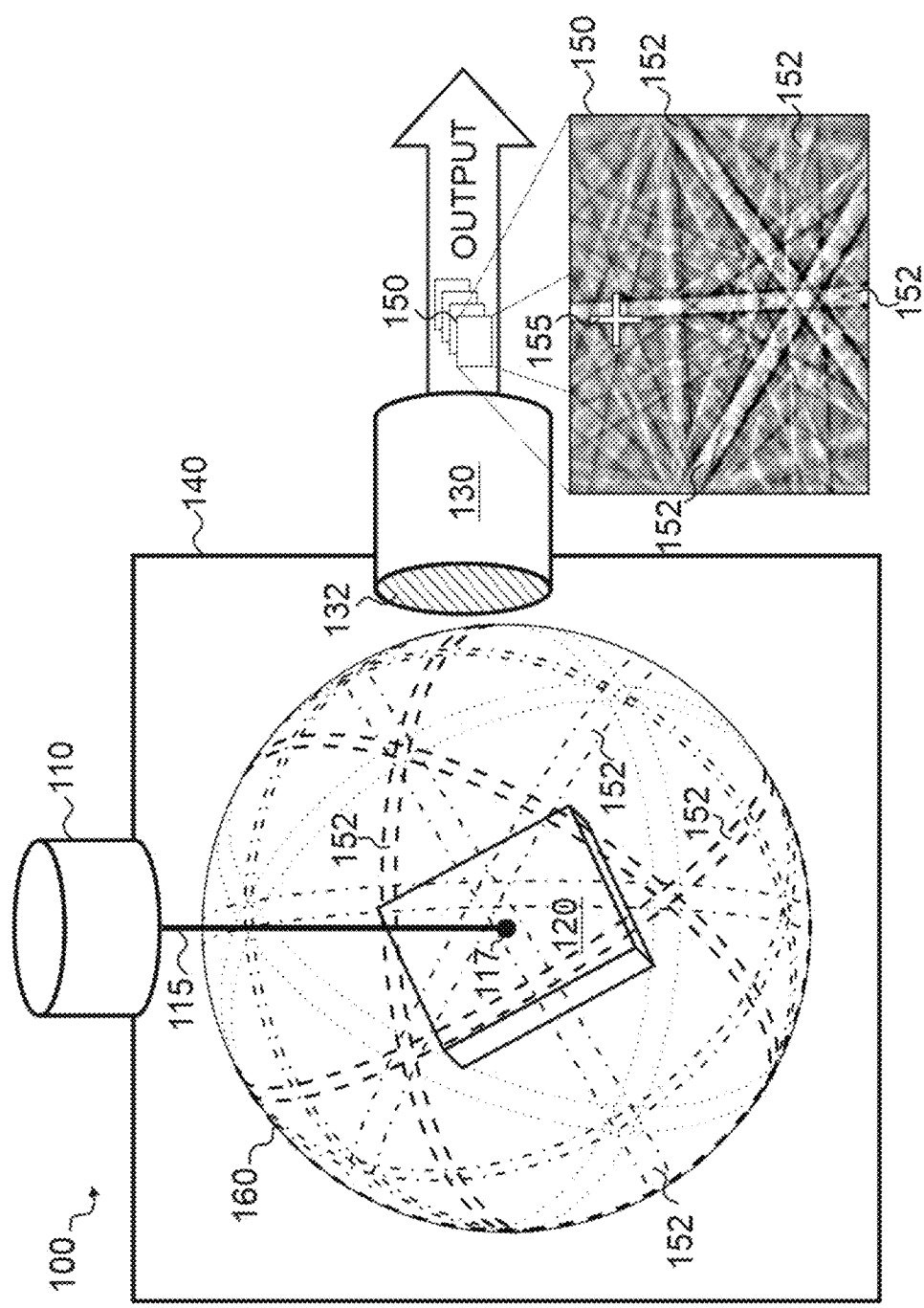
FIG. 1 schematically illustrates an example of an electron backscatter diffraction (EBSD) system.

FIG. 1 schematically illustrates an example of an electron backscatter diffraction (EBSD) system 100. The EBSD system 100 comprises a beam generator 110, such as a scanning electron microscope (SEM), for generating an electron beam 115 and an image capture assembly 130. There is also shown a test sample 120 to be analysed. The test sample 120 would typically be held in place by sample holding means which is not shown.

In the EBSD system 100, the beam generator 110, test sample 120 and image capture assembly 130 are preferably housed within an evacuated analysis chamber 140. The EBSD system 100 is configured such that at least some of the electrons from the beam generator 110 that are scattered by the test sample 120 will strike a scintillation screen or imaging sensor 132 of the image capture assembly 130. An electron backscatter diffraction pattern can be formed on the scintillation screen or imaging sensor 132. The scintillation screen or imaging sensor 132 is arranged to convert incident electrons into visible light and can thereby form a backscatter diffraction pattern on the scintillation screen or imaging sensor 132 that can be captured by the image capture assembly 130. For ease of discussion the EBSD system described below will be in terms of backscatter diffraction patterns produced on a scintillation screen 132. However it will be appreciated that the discussions apply equally to EBSD systems that perform direct detection of the backscatter diffraction patterns. Such systems typically use an imaging sensor 132 in place of the scintillation screen 132. The imaging sensor 132 (which may be for example any of: a CCD type sensor, or a monolithic CMOS sensor) is arranged to detect the backscatter diffraction pattern directly. Examples of monolithic CMOS sensors include the MediPix family of sensors and the TimePix family of sensors. Such direct detection is well known in the art (see for example PTE Roberts, et al. "A CCD-based image recording system for the CTEM", (1982), Ultramicroscopy 8, 385-396 which is herein incorporated by reference in its entirety; or G McMullan et al. "Electron imaging with Medipix2 hybrid pixel detector", (2007), Ultramicroscopy 107(4-5):401-13 which is herein incorporated by reference in its entirety; or US Patent application US 2016/0054240) and is therefore not described any further herein.

Typically the image capture assembly 130 will be arranged to capture the pattern formed on the scintillation screen or imaging sensor 132 as an EBSD image 150. Typically, the EBSD image 150 will be a digital image in a suitable format. Such an EBSD image 150 may be referred to as an Electron Backscatter Diffraction Pattern (EBSP).

The image capture assembly 130 may be arranged to capture multiple EBSD images. For example, the EBSD system 100 may be arranged to scan (or move) the electron beam 115 in a pre-determined path across the test sample 120. Here the image capture assembly may be configured to capture EBSD images at pre-defined points (or intervals) during the scan. As such, a plurality of EBSD images, corresponding to different regions, or points on the surface of the test sample 120 may be produced. The image capture assembly 130 is configured to output the EBSD image (or images) 150 for further processing, such as the analysis described herein shortly below.

Also shown in FIG. 1 is an example EBSD image 150. The EBSD image 150 is an image of the position of the sample where the sample is struck by the electron beam. This position is in effect the point of incidence 117 of the electron beam 115 and the test sample 120. A number of features, known as Kikuchi bands 152 are visible in the EBSD image 150. A Kikuchi band 152 can be seen as a substantially straight lighter band in the EBSD image 150, typically bordered by two thinner dark lines showing the edges of the Kikuchi band 152.

As would be understood by the skilled person, a Kikuchi band 152 is usually formed by an increased intensity of electrons scattered from the test sample 120, striking the scintillation screen or imaging sensor 132. The geometric position of the Kikuchi band edges produced by scattering of electrons by the test sample 120 is governed by Bragg diffraction. A particular Kikuchi band 152 usually corresponds to electrons scattered from a particular crystal plane in the test sample 120 at the point of incidence 117 of the electron beam 115. Diffraction causes two cones of electrons to be scattered from the test sample 120 (and in particular the crystal plane) which then strikes the scintillation screen or imaging sensor 132 forming the Kikuchi band 152. The apices of the pair of concentric cones are centred at the point of incidence 117 and the cones are typically almost flat with semi-apical angles of 90 degrees minus the Bragg angle for the (hkl) plane being considered.

As would also be appreciated by the skilled person, the Kikuchi bands 152 in an EBSD image 150 may be mapped onto the surface of a sphere 160 centred on the point of incidence 117 of the electron beam 115 and the test sample 120. When mapped onto the surface of such a sphere the edges of each Kikuchi band 152 form two circles of the sphere 160. The centreline of the Kikuchi band forms a great circle of the sphere 160. In effect each Kikuchi band 152 may be thought of as the intersection between the above discussed corresponding scattered cone of electrons and the surface of the sphere 160. A representation of Kikuchi bands 152 on such a sphere 160 is typically known as a "spherical map" of Kikuchi bands 152 or "Spherical Kikuchi Map". The corresponding EBSD image 150 may be considered to be a gnomonic projection of a portion of such a spherical map. Such a projection being effectively formed the planar scintillation screen or imaging sensor 132. In particular, the corresponding EBSD image 150 may be considered to be a gnomonic projection of solid angle of the spherical map subtended by the scintillation screen 132.

Production of Kikuchi bands 152 due to diffraction would be well known to the skilled person—see for example "Electron Backscatter Diffraction in Materials Science, 2nd edition" (2009), pp 2-3, ISBN 978-0-387-88135-5 which is herein incorporated by reference in its entirety—and as such, is not discussed further herein. Similarly, production of spherical maps of Kikuchi bands 152 would also be well known to the skilled person—see for example "Spherical EBSD", Austin P Day, Journal of Microscopy, vol 230, issue 3, (2008), pp 472-486 which is herein incorporated by reference in its entirety.

Also shown on the EBSD image 150 is a point 155. The point 155 (typically known as the "pattern centre") corresponds to the point on the scintillation screen 132 which is closest to the point of incidence 117 of the electron beam 115 and the test sample 120. The pattern centre 155 may be represented as (or may comprise) two components which specified the point on the plane defined by the scintillation screen 132. For example, the pattern centre 155 may comprise an x-coordinate $PC_x$ and a y-coordinate $PC_y$. The pattern centre 155 usually comprises (or is specified with) the distance (or separation) between the scintillation screen 132 and the point of incidence 117 of the electron beam 115. As such, pattern centre 155 may be represented as (or may comprise) three components. Typically, such a pattern centre 152 comprises the x-coordinate $PC_x$, the y-coordinate $PC_y$, and a z-coordinate $PC_z$. Here the z-coordinate $PC_z$ is the distance between the scintillation screen 132 and the point of incidence 117 of the electron beam 115. The pattern centre 155 is typically measured (or estimated) before generating the EBSD image 150.

It will be appreciated that the EBSD system 100 outlined above serves merely as an example as to how an EBSD image 150 may be generated. The embodiments of the invention presented below may use any suitable EBSD image 150 produced by any EBSD system 100.

Figure 2:
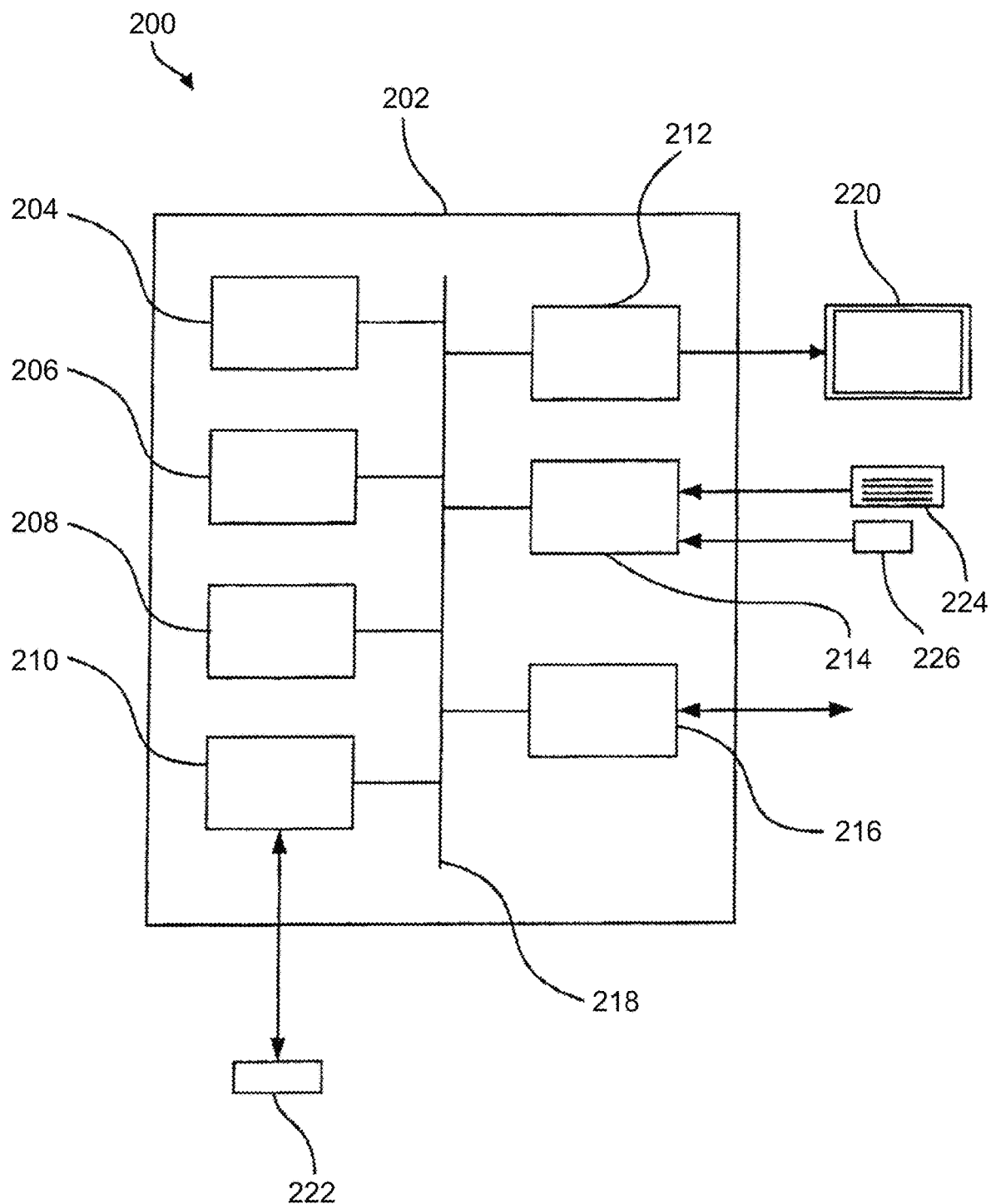
FIG. 2 schematically illustrates an example of a computer system.

FIG. 2 schematically illustrates an example of a computer system 200. The system 200 comprises a computer 202. The computer 202 comprises: a storage medium 204, a memory 206, a processor 208, an interface 210, a user output interface 312, a user input interface 214 and a network interface 216, which are all linked together over one or more communication buses 218.

The storage medium 204 may be any form of non-volatile data storage device such as one or more of a hard disk drive, a magnetic disc, an optical disc, a ROM, etc. The storage medium 204 may store an operating system for the processor 308 to execute in order for the computer 202 to function. The storage medium 204 may also store one or more computer programs (or software or instructions or code).

The memory 206 may be any random access memory (storage unit or volatile storage medium) suitable for storing data and/or computer programs (or software or instructions or code).

The processor 208 may be any data processing unit suitable for executing one or more computer programs (such as those stored on the storage medium 204 and/or in the memory 206), some of which may be computer programs according to embodiments of the invention or computer programs that, when executed by the processor 208, cause the processor 208 to carry out a method according to an embodiment of the invention and configure the system 200 to be a system according to an embodiment of the invention. The processor 208 may comprise a single data processing unit or multiple data processing units operating in parallel, separately or in cooperation with each other. The processor 208, in carrying out data processing operations for embodiments of the invention, may store data to and/or read data from the storage medium 204 and/or the memory 206.

The interface 210 may be any unit for providing an interface to a device 222 external to, or removable from, the computer 202. The device 222 may be a data storage device, for example, one or more of an optical disc, a magnetic disc, a solid-state-storage device, etc. The device 222 may have processing capabilities—for example, the device may be a smart card. The interface 210 may therefore access data from, or provide data to, or interface with, the device 222 in accordance with one or more commands that it receives from the processor 208.

The user input interface 214 is arranged to receive input from a user, or operator, of the system 200. The user may provide this input via one or more input devices of the system 200, such as a mouse (or other pointing device) 226 and/or a keyboard 224, that are connected to, or in communication with, the user input interface 214. However, it will be appreciated that the user may provide input to the computer 202 via one or more additional or alternative input devices (such as a touch screen). The computer 202 may store the input received from the input devices via the user input interface 214 in the memory 206 for the processor 208 to subsequently access and process, or may pass it straight to the processor 208, so that the processor 208 can respond to the user input accordingly.

The user output interface 212 is arranged to provide a graphical/visual output to a user, or operator, of the system 200. As such, the processor 208 may be arranged to instruct the user output interface 212 to form an image/video signal representing a desired graphical output, and to provide this signal to a monitor (or screen or display unit) 220 of the system 200 that is connected to the user output interface 212.

Finally, the network interface 216 provides functionality for the computer 202 to download data from and/or upload data to one or more data communication networks.

It will be appreciated that the architecture of the system 200 illustrated in FIG. 2 and described above is merely exemplary and that other computer systems 200 with different architectures (for example with fewer components than shown in FIG. 2 or with additional and/or alternative components than shown in FIG. 2) may be used in embodiments of the invention. As examples, the computer system 200 could comprise one or more of: a personal computer; a server computer; a laptop, a Field Programmable Gate Array; etc.

Figure 3A:
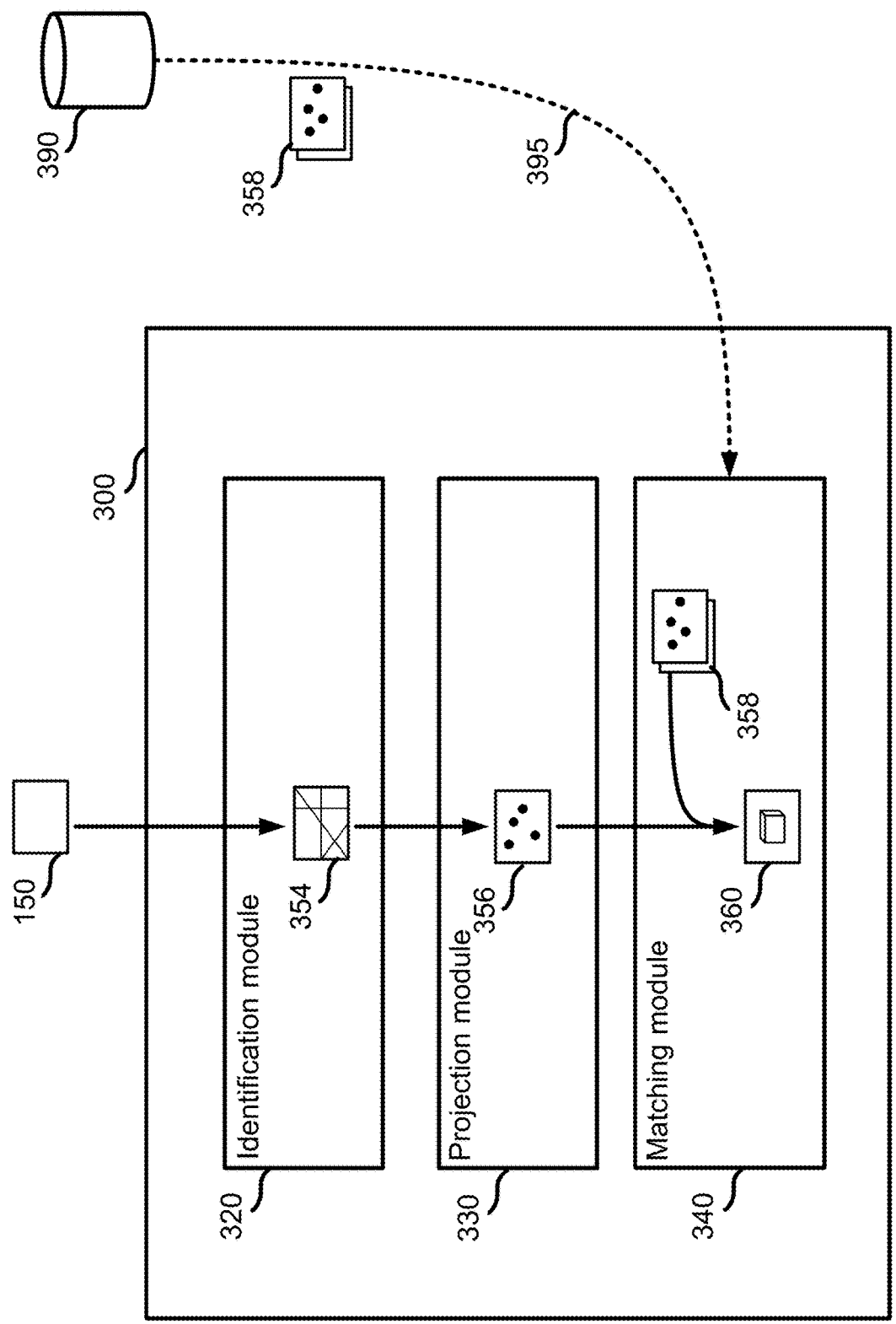
FIG. 3A schematically illustrates an example EBSD image analysis system.

FIG. 3A schematically illustrates an example EBSD image analysis system 300. The figure shows the system 300 receiving an EBSD image 150, produced from a test sample 120, as input so as to characterise the test sample 120. The EBSD image 150 is as described previously.

The EBSD image analysis system 300 comprises an identification module 320, a projection module 330 and a matching module 340. The EBSD image analysis system 300 may be implemented on one or more computer systems, such as computer system 200 as described with reference to FIG. 2. The EBSD image analysis system 300 may be communicatively coupled to an EBSD system 100. For example the EBSD image analysis system 300 may be communicatively coupled to an EBSD system 100 via the network interface 216. The EBSD image analysis system 300 is arranged to receive the EBSD image 150. For example the EBSD image analysis system 300 may be arranged to receive the EBSD image 150 via any of: the network interface 216; the input interface 210; the user input interface 214; etc. The EBSD image analysis system 300 may be arranged to have stored thereon the EBSD image 150. For example the EBSD image 150 may be stored on the storage device 204.

The identification module 320 is arranged to identify (or detect) a plurality of Kikuchi bands 152 present in the EBSD image 150, forming a plurality of identified Kikuchi bands 354. Typically, the plurality of Kikuchi bands 152 are identified by detecting straight line features in the image. This may be done automatically using usual techniques in the art. For example, edge detection algorithms may be applied to the image. Alternatively, a Hough (or Radon) transformation may be applied to the image. Here the image is represented on the polar coordinate plane where straight lines of high intensity are represented as points of high intensity. In this way pixels of the EBSD image 150 in Hough space that exceed a predetermined intensity may be identified as Kikuchi bands 152.

Additionally, or alternatively, the identification module 320 may be arranged to identify one or more of the plurality of Kikuchi bands 152 based on user interaction, for example via the user input interface 214. The identification module 320 may be configured to enable a user to place a straight line on a display of the EBSD image 150 that follows the path of a Kikuchi band 152 visually identified by the user.

The identification module 320 may be arranged to identify a band width for one or more of the identified Kikuchi bands 354. The band width may be identified using the same techniques as were used to identify the Kikuchi band 152 itself. For example, an edge detection technique may identify the two outside edges of a Kikuchi band 152. The band width of the Kikuchi band 152 may be calculated based on the separation. Similarly, the band width of the Kikuchi band 152 may be calculated based (and or size) of a point corresponding to the Kikuchi band 152 in Hough space. Additionally, or alternatively a user may specify the band width of a Kikuchi band 152, for example via the user input interface 214.

Typically, the identified Kikuchi band 152 will be represented (and optionally stored) by the identification module 320 as a straight line. More typically, the identified Kikuchi band 152 will be represented (and optionally stored) by the identification module 320 as a straight line centred on the Kikuchi band 152. Similarly, a line width may also be stored for an identified Kikuchi band 152, representing the width of the Kikuchi band 152. Additionally, or alternatively, an identified Kikuchi band 152 may be represented (and optionally stored) by the identification module 320 as two straight lines, each line lying along a respective edge of the Kikuchi band 152. Other parameters may also be calculated and stored for example any of: the intensity or strength of the Kikuchi bands, the asymmetry of the Kikuchi band, the gradient of the Kikuchi band edges; etc.

The projection module 330 is arranged to generate a plurality of points 356 each representing a respective identified Kikuchi band 152. The plurality of points 356 representing the identified Kikuchi bands 354 are relative to (or have) a common reference, typically the point of incidence 117 of the electron beam 115 and the test sample 120. In view of the discussion above regarding the relationship between the point of incidence 117 and the pattern centre 155, it will be appreciated that the pattern centre 115 may be used in place of the point of incidence 117. Each point may be determined as an intersection between a vector representation of the respective Kikuchi band 152, and a cylindrically symmetric surface. The cylindrically symmetric surface is aligned substantially parallel to a line joining the point of incidence 117 and the pattern centre 155.

For ease of understanding embodiments of the invention will described below using the example of a cylindrical surface substantially parallel with a line joining the point of incidence 117 and the pattern centre 155. However, it will be appreciated that the cylindrically symmetric surface may be any suitable surface of revolution about an axis substantially parallel to (or coincident with) a line joining the point of incidence 117 and the pattern centre 155. As such, the projection module 330 is usually arranged to determine a vector representing the respective Kikuchi band 152 relative to (or based at least in part on) the point of incidence 117. In effect the projection module 330 is usually arranged to map each Kikuchi band 152 to a respective vector. It will be appreciated that a Kikuchi band 152, being a circle of the sphere 160 as described above in FIG. 1, defines a plane. The vector representing the Kikuchi band 152 is typically determined from the plane defined by the Kikuchi band 152. In particular a normal vector of (or to) the plane may be used. For example the vector representation of the respective Kikuchi band 152 may be (or be determined based on) a vector, passing through the point of incidence 117, normal to the plane defined by the Kikuchi band 152.

The projection module 330 may be arranged to associate an intensity (or strength) with (or as part of) each point of the plurality of points 356. The intensity would typically represent the strength of the detected Kikuchi. Additionally, or alternatively, the intensity may represent (or comprise) width of the corresponding Kikuchi band 152, or a weighted combination of the strength and the width. Similarly, the intensity may represent (or comprise) some other measured property (such as Kikuchi band asymmetry).

It will be appreciated that a number of variations to the process for determining the vector representation of the respective Kikuchi band 152 are possible. For example in the above described determination of the vector representation, any one or more predetermined injective transformations may be included, such as a rotation, a vector cross product with a pre-determined vector, a translation, and so on.

The cylindrical surface is also determined relative to (or based at least in part on) the point of incidence 117. The orientation of the cylindrical surface may be chosen with the aim of minimizing (or reducing) the spread in the axial direction of the cylindrical surface of the plurality of points 356 representing the identified Kikuchi bands 354. In the example given above, the cylindrical surface may be perpendicular to the scintillation screen 132. In other words the cylindrical surface may be aligned along the direction of $PC_z$ (or a vector passing through the pattern centre and the point of incidence 117). Usually the radius of the cylindrical surface is (or is based on) the separation, $PC_z$, between the scintillation screen 132 and the point of incidence 117.

As will be appreciated for an EBSD image 150 formed using EBSD apparatus such as that set out in FIG. 1 the pattern centre 155, and by extension the point of incidence 117, are measured (or estimated) points. As such, the pattern centre 155 (or point of incidence 117) used by the projection module 330 as set out above is subject to errors of measurement and/or estimation.

The matching module 340 is arranged to determine a configuration 360 of the test sample 120 based on the plurality of points 356 representing the identified Kikuchi bands 354. In this way the matching module 340 may be said to be arranged to characterise the test sample 120 by way of the produced configuration 360. In particular, the matching module 340 is arranged to determine the configuration 360 based on matching the plurality of points 356 representing the identified Kikuchi bands 354 with a number of sets of expected points 358. Typically, each set of expected points 358 correspond to an EBSD image 150 for a known sample. The EBSD image 150 for each set of expected points has been processed as set out above in relation to the identification module 320 and the projection module 330. In this way each set of expected points 358 is (or comprises) a plurality of points representing the identified Kikuchi bands 354 for an already known sample, which has a corresponding known configuration.

It will be appreciated that the EBSD image 150 for a given set of expected points 358 may be an experimental image—i.e. formed using an EBSD system 100 such as that discussed in FIG. 1. Alternatively, the EBSD image 150 may be a theoretical image. In particular, the EBSD image 150 may be generated by simulation, such as kinematical and/or dynamical simulations where the electron diffraction from a known sample, with a known configuration, is determined according to a computational model and a predicted EBSD image 150 produced. See for example "Many-beam dynamical simulation of electron backscatter diffraction patterns", Aimo Winkelmann, Carol Trager-Cowan, Francis Sweeney, Austin P. Day, Peter Parbrook, Ultramicroscopy 107, 414 (2007). Such simulation of EBSD images 150 is well-known and therefore not discussed further herein.

Usually, the matching module 340 is arranged to compare the plurality of points 356 representing the identified Kikuchi bands 354 with a set of expected points 358 to determine whether there is a match between the plurality of points 356 representing the identified Kikuchi bands 354 and the set of expected points 358. For example, a point in the plurality of points 356 representing the identified Kikuchi bands 354 may be said to match (or correspond to) a point in the set of expected points if the two points are within a pre-determined distance of each other. The plurality points 356 representing the identified Kikuchi bands 354 may be said to match (or correspond to) the set of expected points if there is more than a predetermined number (or threshold) number of such matched points.

Additionally or alternatively various other criteria may be used when determining (or identifying) a match between the plurality of points 356 representing the identified Kikuchi bands 354 and a set of expected points. For example, an overall matching score (or goodness of fit measure) may be formed for the plurality points 356 representing the identified Kikuchi bands 354 and the set of expected points. Each match between a point representing the identified Kikuchi band and an expected point may be weighted according to (or assigned a score based on) a distance between the two points. For example, matches between points that are close together may gain a greater weighting than matches between points that have a greater separation. Additionally, or alternatively each match between a point representing the identified Kikuchi band and an expected point may be weighted according to (or assigned a score based on) the intensity of one or both points. For example, matches between points of high intensities may gain a greater weighting than matches between points of low intensities. The overall matching score may comprise a sum (or accumulation) of these weightings. In this way a match may be determined to exist between the plurality points 356 representing the identified Kikuchi bands 354 and a set of expected points if the overall matching score meets a pre-determined threshold value. It will be appreciated that the various thresholds may be adjusted (or pre-determined) to take account of the accuracy of the EBSD images 150 and methods used. It will also be appreciated that different schemes and weightings may be used to calculate the overall matching score; for example an arithmetic or geometric mean, or some combination thereof.

It will be appreciated that by representing the identified Kikuchi bands 354 of the EBSD image 150 and the Kikuchi bands 152 of known samples as points in the manner described above then a greater number of Kikuchi bands 152 can be considered during the matching process than by using the indexing technique of the prior art. In particular, full matching where all of the identified Kikuchi bands 354 are taken account of in the matching and analysis of the test sample 120 may be carried out. This may increase the accuracy of any determined configuration (or individual properties) of the test sample 120 (as described shortly below). Also, for situations where the Kikuchi bands 152 of two different known samples or configurations are substantially similar taking account of more Kikuchi bands 152 may enable better discrimination between the known configurations.

Based on the set or sets of expected points identified as matching the plurality points 356 representing the identified Kikuchi bands 354 a configuration 360 for the test sample 120 may be determined by the matching module 340. In particular the determined configuration 360 for the test sample 120 may be determined based on the known sample corresponding to the matching set of expected points 358. Typically, the determined configuration 360 for the test sample 120 comprises one or more properties of the known sample corresponding to the matching set of expected points 358. The determined configuration 360 may comprise any one or more sample properties including: a crystalline phase; the unit cell dimensions of the crystal; the elements present in a crystal; a crystal orientation; a crystalline defect; one or more impurities present, a list of expected reflectors (Kikuchi bands) with their widths and/or approximate intensities, and so on. It will be appreciated that in some examples more than one set of expected points 358 identified may be identified as matching the plurality points 356 representing the identified Kikuchi bands 354. In such cases, more than one configuration 360 for the test sample 120 may be determined. For example, separate configurations 360 may be determined for the test sample 120 with each configuration being determined from a different matched set of expected points 358. This may correspond to situations where more than one crystal lattice is present in the test sample 120 at or around the point of incidence 117. Additionally, or alternatively, one configuration 360 may be determined based on more than one matched set of expected points 358. In this case, usually, the configuration 360 will comprise one or more properties common to the known samples corresponding to the more than one matched set of expected points 358. This may correspond to situations where crystals differing in a small number of properties produce the same or similar Kikuchi bands 152. An example of this is the face-centred cubic (fcc) crystals of Nickel, Iron, and Aluminium. The matching module 340 may also be arranged to provide (or calculate) a measure of confidence for a determined configuration 360. In particular, the measure of confidence may comprise (or be based on) the overall matching score (or scores) of the corresponding matching set (or sets) of expected points 358. In addition, alternative weighting schemes may be applied to preferentially separate the solutions based on, for example, measured Kikuchi band width.

It will be appreciated that in the above described analysis the sets of expected points 358 may be determined as required, for example using the identification module 320 and the projection module 330. Additionally, or alternatively the sets of expected points 358 may be pre-calculated and stored in a storage such as the storage medium 204, and/or in the device 222. It will be appreciated that the pre-calculated sets of expected points 358 may be stored remote to the system 300, such as on a server and/or cloud computing platform 390. As such, the matching module 340 may be arranged to retrieve the sets of expected points 358 from a server and/or cloud computing platform via a suitable data connection 395. Examples of suitable data connections include, via a local area network, via a wide area network, via a direct data connection (such as a USB connection, a Thunderbolt connection, a Firewire connection, a direct Ethernet connection, etc.), via the Internet, and so on.

As demonstrated shortly below, both the points representing 356 the identified Kikuchi bands 354 and the expected points 358 change in predictable ways with respect to changes in the three components of the respective pattern centre 155, $PC_x$, $PC_y$, and $PC_z$. In other words mathematical relationships between changes in each of the three components of the pattern centre 155 and the resulting changes to the points of the corresponding Kikuchi bands 152 may be derived, as shown shortly below.

In some variants of the system 300 described above the matching module 340 may be arranged to optimize (or adjust) the estimated pattern centre 155 (or point of incidence 117) corresponding to the EBSD image 150 with respect to a matched set of expected points 358. In particular optimizing estimated pattern centre 155 may comprise varying at least one component of the pattern centre 155 based on (or in dependence on) an objective function. For example, at least one component of the pattern centre 155 may be varied with the aim of improving the value of the objective function (such as obtaining an extremum value of the objective function). Optionally, all of the components of the pattern centre 155 may be varied as part of the optimizing step, or a subset may be optimized as part of the optimizing step. It will be understood that the resulting change in the points 356 representing the identified Kikuchi bands 354 caused by the varying of the pattern centre may be calculated directly using the above discussed mathematical relationships during the optimization. Consequently changes to the value of the objective function caused by the varying of the pattern centre 155 may be calculated directly enabling such optimization. The objective function may comprise the overall matching score discussed previously. The matching module may be arranged to calculate an updated goodness of fit measure corresponding to the respective optimized pattern centre 155 for the matched set of expected points 358.

It will be appreciated that the optimization may be carried out using a numerical optimization technique of which many examples are known in the art. For example, the optimization may be implemented, in whole or in part, using any of: a finite differences method e.g. such as Newton's method; a Quasi-Newton method; a conjugate gradient method; a steepest descent method; proximal minimization, downhill simplex/amoeba; an exhaustive search of the parameter space to a certain granularity; etc.

Such optimization may be separately performed with respect to each set of expected points identified as matching the points 356 representing the identified Kikuchi bands 354. It will be appreciated that in this way the matching process may be further improved as the matching module 340 may be arranged to discriminate between the matched sets of expected points 358 (such as to identify the most probable or best match) based on the updated goodness of fit measures. Additionally, or alternatively, the matching module 340 may be arranged to determine a confidence measure of one or more of the matched sets of points 358, based on the respective optimized pattern centres 155. For example the confidence of a match may be inversely proportional to the difference between the optimized pattern centre 155 and the original estimated pattern centre 155.

The confidence measure may also be weighted using any combination of, for example: weighting by a combination of measured and predicted values of Kikuchi band intensity, Kikuchi band width, Kikuchi band symmetry, the presence and/or absence of key Kikuchi bands (which may be advantageous to minimise pseudosymmetric effects).

Figure 3B:
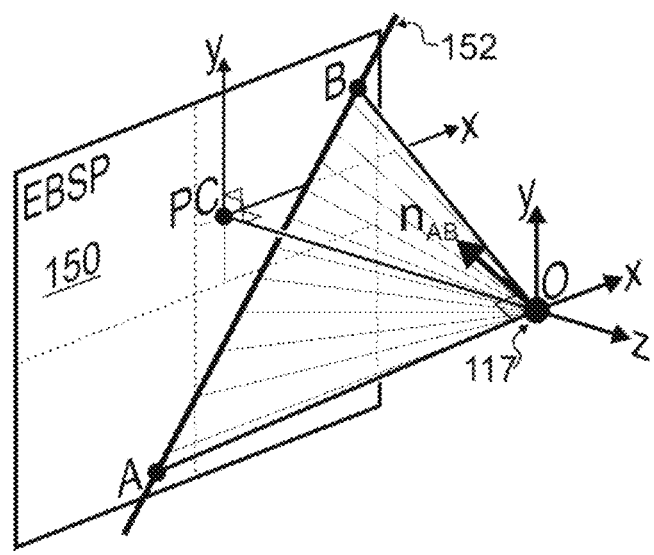
FIG. 3B schematically illustrates geometrical relationships between an EBSD image, an example Kikuchi band and a pattern centre.
Figure 3C:
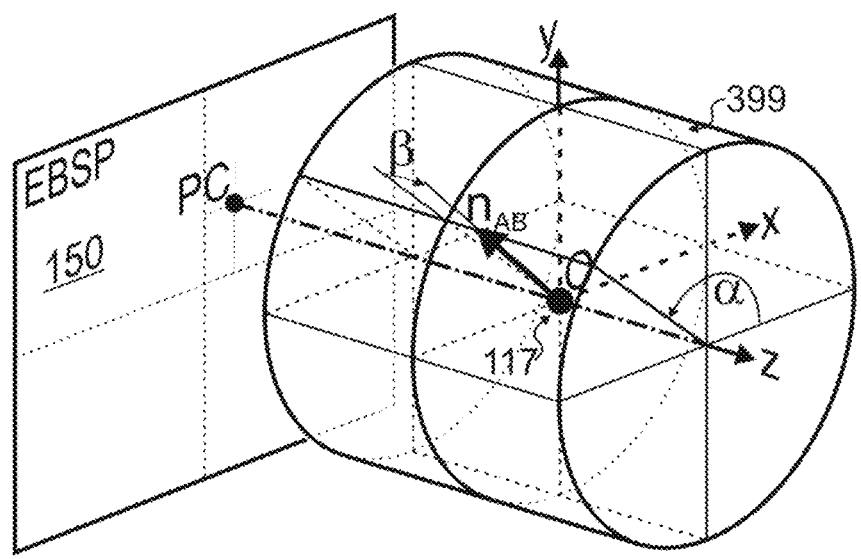
FIG. 3C schematically illustrates geometrical relationships between an EBSD image, an example Kikuchi band normal, a pattern centre, and a cylindrical surface.

FIGS. 3B and 3C schematically illustrate geometrical relationships between an EBSD image 150 (such as that projected onto a scintillator screen 132 described above), an example Kikuchi band 152, a pattern centre PC. The discussions of the EBSD image 150 set out above in respect of FIG. 1 apply equally here.

In FIGS. 3B and 3C a set of axes for a Cartesian co-ordinate system (marked x, y, and z) are shown. Here the xy plane is coincident with the EBSD image plane. The z-axis is perpendicular to the EBSD image plane. The origin O of the Cartesian co-ordinate system coincides with the point of incidence 117 of the electron beam 115 and the test sample 120. In this Cartesian co-ordinate system the pattern centre PC is at the x,y,z co-ordinates ($PC_x$, $PC_y$, $-PC_z$).

In FIG. 3B there is also shown an example Kikuchi band 152 as a line joining the points A and B both on the EBSD image plane. Point A is at the x,y,z co-ordinates ($ax$, $a_y$, $-PC_z$). Point B is at the x,y,z co-ordinates ($b_x$, $b_y$, $-PC_z$). Also show in FIG. 3B (and FIG. 3C) is the vector $n_{AB}$ which is a vector normal to the plane that passes through points A, B and the origin O. As such, it will be appreciated that the vector $n_{AB}$ is an example of a Kikuchi band normal as described previously above.

In FIG. 3C there is shown an example cylindrically symmetric surface 399 (as described in more detail shortly above), which in this example is a cylinder aligned along the line joining the pattern centre PC and the origin O. $\alpha$ is the azimuthal angle of the intersection of the vector $n_{AB}$ with the cylindrical surface 399. $\beta$ is the z-coordinate of the intersection of the vector $n_{AB}$ with the cylindrical surface 399.

Figure 3D:
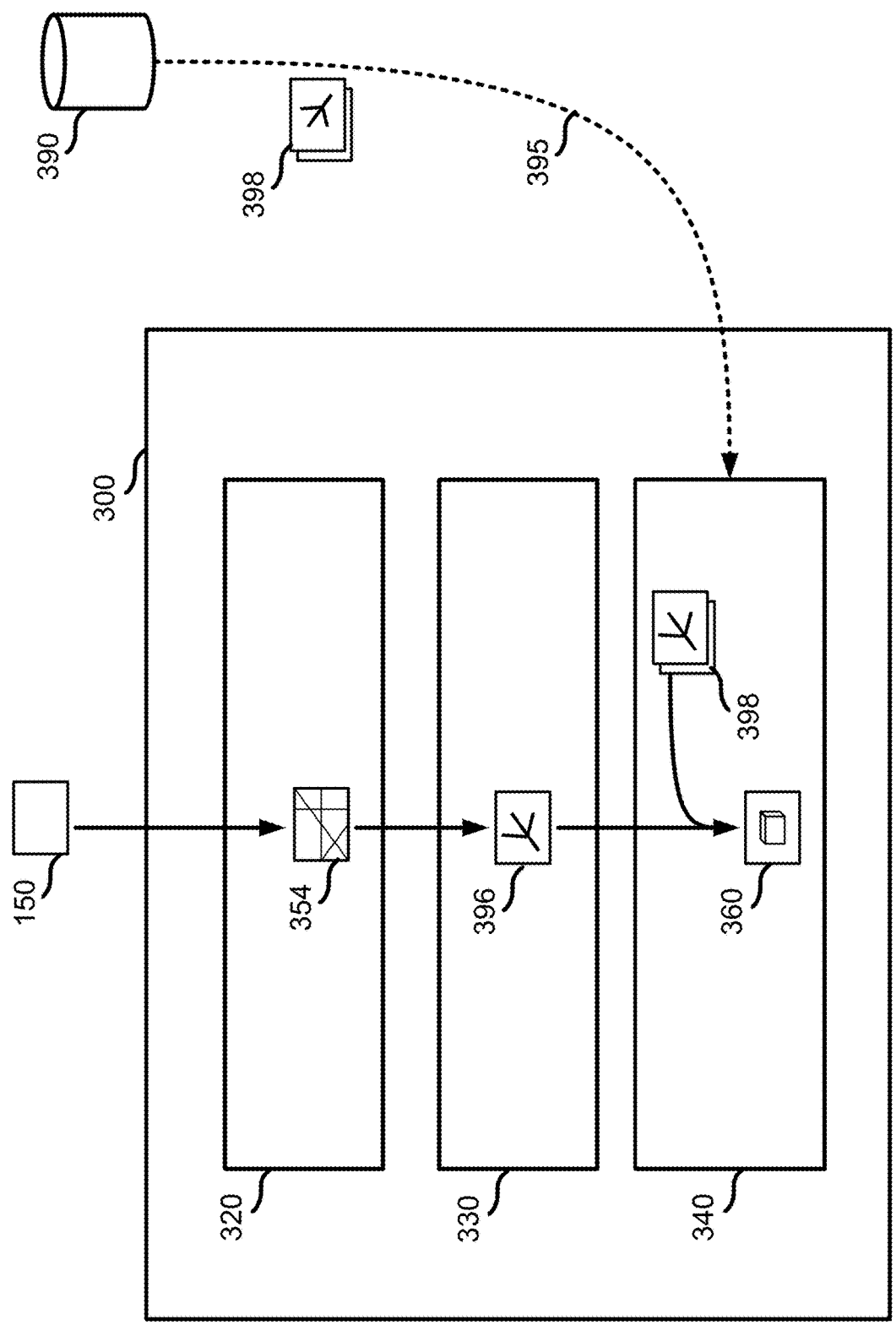
FIG. 3D schematically illustrates a variant example EBSD image analysis system.

FIG. 3D schematically illustrates a variant of the EBSD image 150 analysis system 300 discussed above. The above discussion of the EBSD image 150 analysis system 300 with reference to FIG. 3A applies equally here with the following alterations.

The projection module 330 is arranged to determine a vector representing the respective Kikuchi band 152 relative to (or based at least in part on) the point of incidence 117. In effect the projection module 330 is arranged to map each Kikuchi band 152 to a respective vector, forming a plurality of vectors for the set of identified Kikuchi bands. It will be appreciated that a Kikuchi band 152, being a circle of the sphere 160 as described above in FIG. 1, defines a plane. The vector representing the Kikuchi band 152 is typically determined from the plane defined by the Kikuchi band 152. In particular, a normal vector of (or to) the plane may be used. For example the vector representation of the respective Kikuchi band 152 may be (or be determined based on) a vector, passing through the point of incidence 117, normal to the plane defined by the Kikuchi band 152.

It will be appreciated that a number of variations to the process for determining the vector representation of the respective Kikuchi band 152 are possible. For example in the above described determination of the vector representation, any one or more predetermined injective transformations may be included, such as a rotation, a vector cross product with a pre-determined vector, a translation, and so on.

The matching module 340 is arranged to determine a configuration 360 of the test sample 120 based on the plurality of vectors representing the identified Kikuchi bands 354. In this way the matching module 340 may be said to be arranged to characterise the test sample 120 by way of the produced configuration 360. In particular, the matching module 340 is arranged to determine the configuration 360 based on matching the plurality of vectors 396 representing the identified Kikuchi bands 354 with a number of sets of expected vectors 398. Typically, each set of expected vectors 398 correspond to an EBSD image 150 for a known sample. The EBSD image 150 for each set of expected vectors has been processed as set out above in relation to the identification module 320 and the projection module 330. In this way each set of expected vectors 398 is (or comprises) a plurality of vectors representing the identified Kikuchi bands 354 for an already known sample, which has a corresponding known configuration.

It will be appreciated that the EBSD image 150 for a given set of expected vectors 358 may be an experimental image—i.e. formed using an EBSD system 100 such as that discussed in FIG. 1. Alternatively, the EBSD image 150 may be a theoretical image as discussed previously above.

The matching module 340 is arranged to compare the plurality of vectors 396 representing the identified Kikuchi bands 354 with a set of expected vectors 398 to determine whether there is a match between the plurality of vectors 396 representing the identified Kikuchi bands 354 and the set of expected vectors 358. For example, a vector in the plurality of vectors 396 representing the identified Kikuchi bands 354 may be said to match (or correspond to) a vectors in the set of expected vectors if the magnitude of an arithmetic difference of the two vectors is below a pre-determined threshold. The plurality vectors 396 representing the identified Kikuchi bands 354 may be said to match (or correspond to) the set of expected vectors if there is more than a predetermined number (or threshold) number of such matched vectors.

Additionally or alternatively various other criteria may be used when determining (or identifying) a match between the plurality of vectors 396 representing the identified Kikuchi bands 354 and a set of expected vectors. For example, an overall matching score (or goodness of fit measure) may be formed for the plurality vectors 396 representing the identified Kikuchi bands 354 and the set of expected vectors. Each match between a point representing the identified Kikuchi band and an expected point may be weighted according to (or assigned a score based on) the intensity of one or both vectors. For example, matches between vectors of high intensities may gain a greater weighting than matches between vectors of low intensities. The overall matching score may comprise a sum (or accumulation) of these weightings. In this way a match may be determined to exist between the plurality vectors 396 representing the identified Kikuchi bands 354 and a set of expected vectors if the overall matching score meets a pre-determined threshold value. It will be appreciated that the various thresholds may be adjusted (or pre-determined) to take account of the accuracy of the EBSD images 150 and methods used. It will also be appreciated that different schemes and weightings may be used to calculate the overall matching score; for example an arithmetic or geometric mean, or some combination thereof.

Based on the set or sets of expected vectors identified as matching the plurality vectors 356 representing the identified Kikuchi bands 354 a configuration 360 for the test sample 120 may be determined by the matching module 340. In particular the determined configuration 360 for the test sample 120 may be determined based on the known sample corresponding to the matching set of expected vectors 398.

Typically, the determined configuration 360 for the test sample 120 comprises one or more properties of the known sample corresponding to the matching set of expected vectors 398. The determined configuration 360 may comprise any one or more sample properties including: a crystalline phase; the unit cell dimensions of the crystal; the elements present in a crystal; a crystal orientation; a crystalline defect; one or more impurities present, a list of expected reflectors (Kikuchi bands) with their widths and/or approximate intensities, and so on. It will be appreciated that in some examples more than one set of expected vectors 398 identified may be identified as matching the plurality vectors 396 representing the identified Kikuchi bands 354. In such cases, more than one configuration 360 for the test sample 120 may be determined. For example, separate configurations 360 may be determined for the test sample 120 with each configuration being determined from a different matched set of expected vectors 398. This may correspond to situations where more than one crystal lattice is present in the test sample 120 at or around the point of incidence 117. Additionally, or alternatively, one configuration 360 may be determined based on more than one matched set of expected vectors 398. In this case, usually, the configuration 360 will comprise one or more properties common to the known samples corresponding to the more than one matched set of expected points 398. This may correspond to situations where crystals differing in a small number of properties produce the same or similar Kikuchi bands 152. An example of this is the face-centred cubic (fcc) crystals of Nickel, Iron, and Aluminium. The matching module 340 may also be arranged to provide (or calculate) a measure of confidence for a determined configuration 360. In particular, the measure of confidence may comprise (or be based on) the overall matching score (or scores) of the corresponding matching set (or sets) of expected vectors 358. In addition, alternative weighting schemes may be applied to preferentially separate the solutions based on, for example, measured Kikuchi band width.

It will be appreciated that in the above described analysis the sets of expected vectors 398 may be determined as required, for example using the identification module 320 and the projection module 330. Additionally, or alternatively the sets of expected vectors 398 may be pre-calculated and stored in a storage such as the storage medium 204, and/or in the device 222. It will be appreciated that the pre-calculated sets of expected vectors 398 may be stored remote to the system 300, such as on a server and/or cloud computing platform 390. As such, the matching module 340 may be arranged to retrieve the sets of expected vectors 358 from a server and/or cloud computing platform via a suitable data connection 395. Examples of suitable data connections include, via a local area network, via a wide area network, via a direct data connection (such as a USB connection, a Thunderbolt connection, a Firewire connection, a direct Ethernet connection, etc.), via the Internet, and so on.

In a further variant the matching module is arranged to match the plurality of vectors to one or more expected sets of vectors to within a rotation. In particular, the matching module may be arranged to obtain a rotation transform which when applied to the plurality of vectors (or to the expected set of vectors) minimized (or aims to minimize) the difference between the two sets of vectors. This approach may be particularly advantageous when the vectors are related to the respective planes defined by their respective Kikuchi bands by a pre-determined relation (such as when the vectors are normal to said plane). In this case EBSD images of the same sample which only differ in relation to the positioning of the scintillation screen 132 may be expected to produce respective pluralities of vectors which differ by a rotation.

Figure 3E:
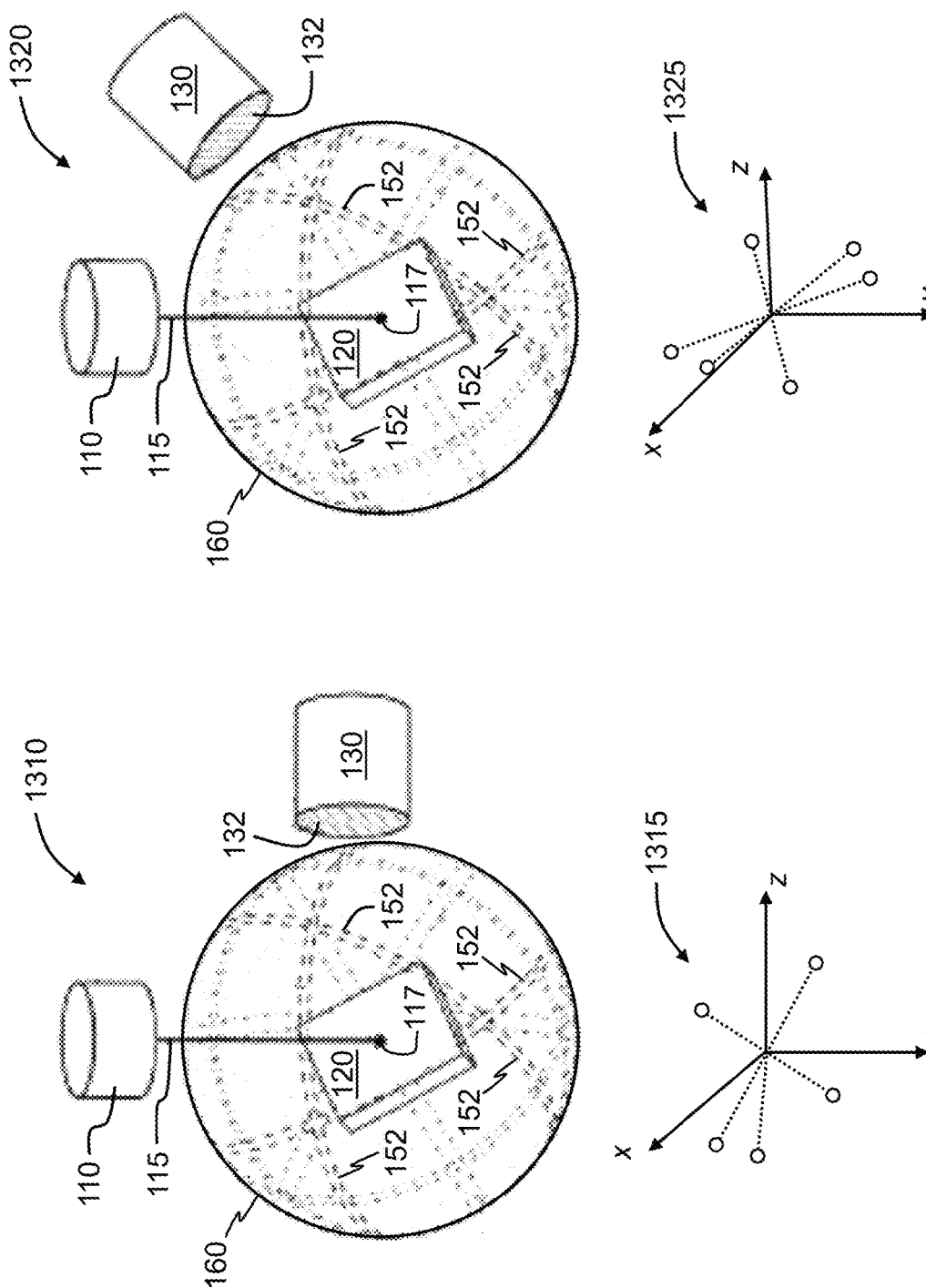
FIG. 3E schematically illustrates the effects of a change in position of a scintillator screen.

This is schematically illustrated in FIG. 3E which shows a first arrangement 1310 of an EBSD imaging experiment, and a second arrangement 1320 of the same EBSD imaging experimented where the scintillation screen 132 screen has been moved relative to the first arrangement.

As can be seen the plurality of vectors 1315 for the first arrangement and the plurality of vectors 1325 for the second arrangement differ only by a rotation about the origin. This is because the Kikuchi bands, which form great circles on a notional sphere centred on the point of incidence are not affected by the movement of the scintillator screen 132. The vectors are shown in FIG. 3E by the dashed lines terminating in circles, and the co-ordinate axes are shown by the solid lines terminating in arrows.

In this way, by using the further variant where the matching module is arranged to match the plurality of vectors to one or more expected sets of vectors to within a rotation fewer sets of expected vectors need to be considered.

It will be appreciated that any suitable known method to obtain the rotation transform may be used. One such suitable method is the use of quaternions as described in "*Quaternions in molecular modeling*" by C. F. F. Kerney (2007), Journal of Molecular Graphics & Modelling, vol. 25, pp. 595-604, doi: 10.1016/j.jmgm.2006.04.002 which is incorporated herein by reference in its entirety. For example, take a plurality of vectors $\{n_l\}$, a set of expected vectors $\{n'_l\}$ and a general rotation $R_q(x)$, $R_q(x)$ can be sought by minimizing the following expression:

$$\frac{1}{W}\sum_l w_l |n'_l - R_q(n_l)|^2$$

Where, in quaternion algebra $q = q_o 1 + q_1 i + q_2 j + q_3 k$ and $$\begin{bmatrix} 0 \\ R_q(n_l) \end{bmatrix} = q \begin{bmatrix} 0 \\ n_l \end{bmatrix} \overline{q}$$

(assuming the notation of 1 as the identity element such that $i^2 = j^2 = k^2 = -1$) Weight $w_l$ for each Kikuchi band, as described above, may be based on the intensity of said Kikuchi band or some other measure of importance of the Kikuchi band. They may alternatively simply be set to a constant value such as 1. W is a normalization factor for the weights.

This leads to an eigenvalue problem:

$$E = q^T \cdot B \cdot q$$

where $$B = \frac{1}{W} \sum_l w_l A_l^T \cdot A_l$$

is 4×4 symmetric matrix which has real eigenvalues $\lambda_0$, $\lambda_1$, $\lambda_2$, $\lambda_3$ where $0 \leq \lambda_0 \leq \lambda_1 < \lambda_2 < \lambda_3$. Here for completeness we note $A_l$ is a 4×4 skew matrix. $A_l = A(n'_l + n_l, n'_l - n_l)$, where $$A(a, b) = \begin{pmatrix} 0 & -b^T \\ b & -I \times a \end{pmatrix}.$$

Solving the eigenvalue problem can then be done by conventional means and setting q as the eigenvector corresponding to the eigenvalue $\lambda_0$ given the minimum value for E and therefore the initial expression, and provides the required rotation $R_q$.

It will be appreciated that the above discussion of how to obtain the rotation is merely exemplary and the skilled person would be aware of other ways in which a rotation between the two sets of vectors may be obtained.

In the above example it is also noted that a correspondence between vectors of the plurality and vectors of the set of expected vectors is assumed by use of a common index l. This may be done by performing the above minimization for all possible correspondences and selecting the one that produces the minimum eigenvalue. As discussed further shortly below in some cases candidate sets of expected vectors are selected during which correspondences between vectors may be inferred or determined.

Figure 4A:
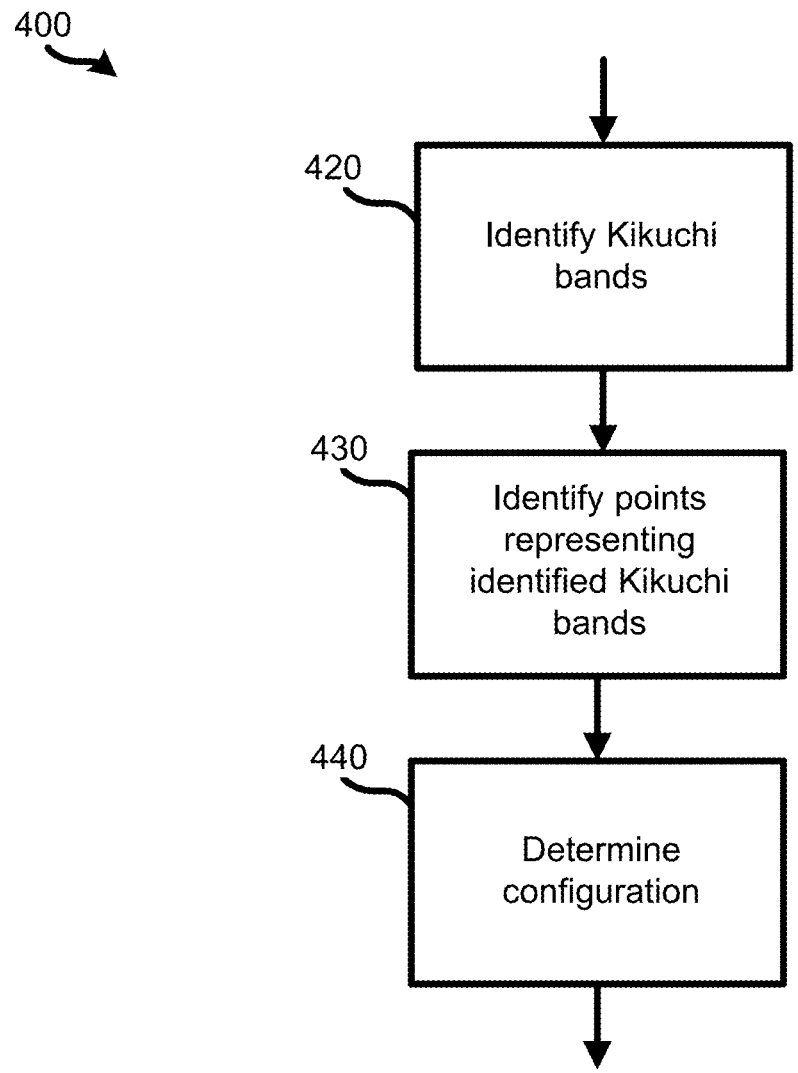
FIG. 4A schematically illustrates a method carried out by an EBSD image analysis system, such as the EBSD image analysis system of FIG. 3A.

FIG. 4A schematically illustrates a method 400 carried out by an EBSD image 150 analysis system, such as the EBSD image 150 analysis system 300 of FIG. 3A.

At a step 420 a plurality of Kikuchi bands 152 present in the EBSD image 150 are identified. The step 420 may comprise detecting straight line features in the EBSD image 150 to thereby identify one or more Kikuchi bands 152 in the EBSD image 150. The step 420 may comprise applying a Hough (or Radon) transformation (optionally, with filtering and/or peak detection) to the EBSD image 150 to thereby identify one or more Kikuchi bands 152 in the EBSD image 150. Additionally, or alternatively, as part of step 420 one or more Kikuchi bands 152 may be identified based at least in part on based on user interaction. The step 420 may further comprise identifying a band width for one or more of the identified Kikuchi bands 354, as discussed previously.

At a step 430 plurality of points each representing a respective identified Kikuchi band of the plurality of identified Kikuchi bands 354 are generated. Usually each point is determined as an intersection between a vector representation of the respective Kikuchi band 152 (for example the Kikuchi band plane normals), and a cylindrical surface or cylindrically symmetric surface (as described previously). The step 430 may comprise determining a vector representing the respective Kikuchi band 152 relative to (or based at least in part on) the point of incidence 117. The vector representing the respective Kikuchi band 152 may be determined as discussed previously. In the step 430 the vector representing the Kikuchi band 152 is usually determined from the plane defined by the Kikuchi band 152. For example, in the step 430 the vector representation of the respective Kikuchi band 152 may be determined based on a vector, passing through the point of incidence 117, normal to the plane defined by the Kikuchi band 152. The step 430 may also include associating an intensity (or strength) with (or as part of) each point. The intensity would typically represent the width of the corresponding Kikuchi band 152.

At a step 440 a configuration 360 is determined for the test sample 120 based on the plurality of points 356 representing the identified Kikuchi bands 354. The step 440 comprises identifying one or more sets of expected points 358 that match the plurality of points 356 representing the identified Kikuchi bands 354. Usually, the step 440 is arranged to compare the plurality points 356 representing the identified Kikuchi bands 354 with a set of expected points 358 to determine whether there is a match between the plurality points 356 representing the identified Kikuchi bands 354 and the set of expected points 358. It will be appreciated that such a comparison may be done point by point. Alternatively, the comparison may be done across multiple points in the plurality points 356 representing the identified Kikuchi bands 354 and the set of expected points 358 at the same time. The determination of the configuration 360 in the step 440 is based on the set or sets of expected points identified as matching the plurality points 356 representing the identified Kikuchi bands 354. Typically a configuration 360 comprising one or more properties corresponding to the matched (or identified) set or sets of expected points 358 is determined at the step 440.

Figure 4B:
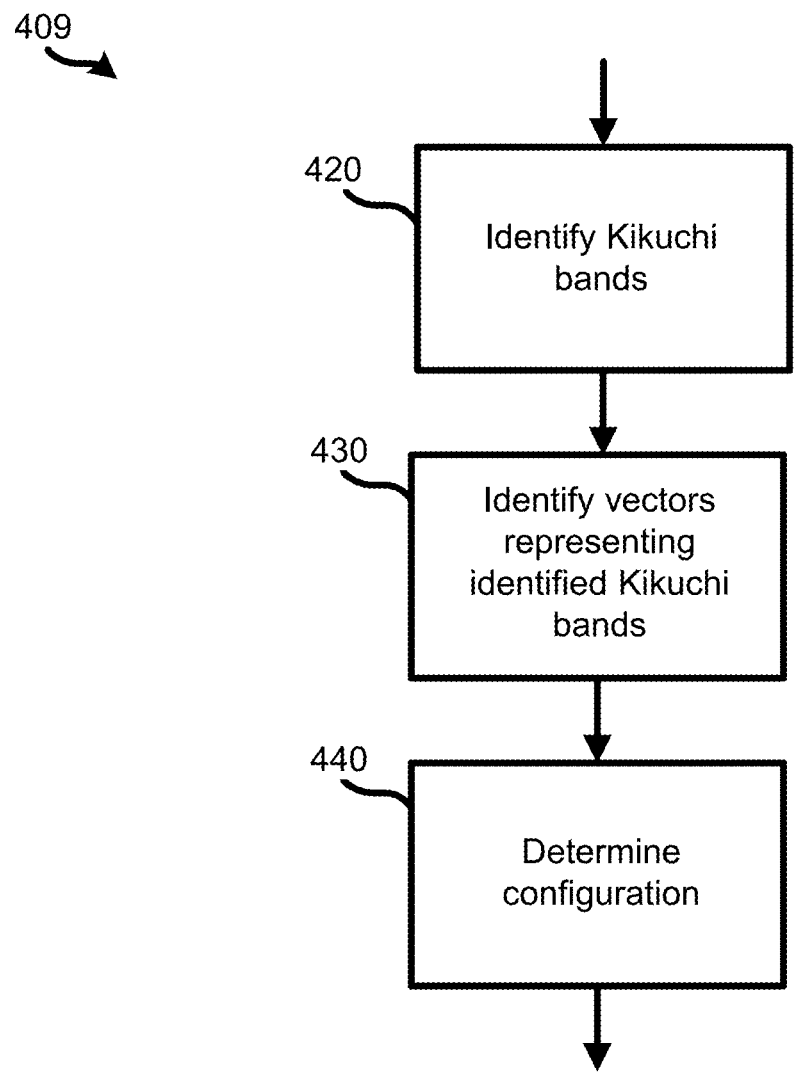
FIG. 4B schematically illustrates a variant method carried out by an EBSD image analysis system, such as the EBSD image analysis system of FIG. 3D FIG. 5A schematically illustrates a variant of the EBSD image analysis system of FIG. 3A.

It will be appreciated that the configuration 360 determined as part of the step 440 may be output or otherwise provided to a user. Additionally, or alternatively the configuration 360 may be stored and/or made available to further analysis tools for further processing or analysis. For example, FIG. 4B schematically illustrates a method 409 carried out by a variant EBSD image 150 analysis system, such as the variant EBSD image 150 analysis system 300 of FIG. 3D. The method 409 is a variant of the method 400 discussed above. The above discussion of the method 400 with reference to FIG. 4A applies equally here with the following alterations.

At a step 430 plurality of vectors each representing a respective identified Kikuchi band of the plurality of identified Kikuchi bands 354 are generated. The step 430 may comprise determining a vector representing the respective Kikuchi band 152 relative to (or based at least in part on) the point of incidence 117. The vector representing the respective Kikuchi band 152 may be determined as discussed previously. In the step 430 the vector representing the Kikuchi band 152 is usually determined from the plane defined by the Kikuchi band 152. For example, in the step 430 the vector representation of the respective Kikuchi band 152 may be determined based on a vector, passing through the point of incidence 117, normal to the plane defined by the Kikuchi band 152. Whilst normal vectors are used as examples herein it will be appreciated that the vector may be generated according to any pre-defined relationship to the plane. The step 430 may also include associating an intensity (or strength) with (or as part of) each vector. The intensity would typically represent the width of the corresponding Kikuchi band 152.

At a step 440 a configuration 360 is determined for the test sample 120 based on the plurality of vectors 356 representing the identified Kikuchi bands 354. The step 440 comprises identifying one or more sets of expected vectors 398 that match the plurality of vectors 396 representing the identified Kikuchi bands 354. Usually, the step 440 is arranged to compare the plurality vectors 396 representing the identified Kikuchi bands 354 with a set of expected vectors 398 to determine whether there is a match between the plurality vectors 356 representing the identified Kikuchi bands 354 and the set of expected vectors 398. It will be appreciated that such a comparison may be done vectors by vectors. Alternatively, the comparison may be done across multiple vectors in the plurality vectors 396 representing the identified Kikuchi bands 354 and the set of expected vectors 398 at the same time. The determination of the configuration 360 in the step 440 is based on the set or sets of expected vectors identified as matching the plurality vectors 396 representing the identified Kikuchi bands 354. Typically a configuration 360 comprising one or more properties corresponding to the matched (or identified) set or sets of expected vectors 398 is determined at the step 440.

FIG. 5A schematically illustrates a variant the EBSD image 150 analysis system 500. The variant the EBSD image 150 analysis system 500 is a variant of the EBSD image 150 analysis system 300 discussed above. The above discussion of the EBSD image 150 analysis system 300 with reference to FIG. 3A and FIG. 4A applies equally here with the following alterations.

The matching module 340 further comprises a candidate selection module 545. The candidate selection module 545 is arranged to identify (or determine) one or more candidate sets of expected points from the number of sets of expected points. In particular, the candidate section module 545 is arranged to determine whether a set of expected points 358 is a candidate set of expected points 558 based on matching the azimuthal angles of the points in the set 358 with the azimuthal angles of the points representing the identified Kikuchi bands 354. As will be appreciated the azimuthal angle of a point is based on the azimuthal position of that point on the cylindrical surface discussed previously.

In a similar manner to the point matching described with respect to FIG. 3A above, a point in the plurality of points representing the identified Kikuchi bands 354 may be said to match (or correspond to) a point in the set of expected points 358 if the difference in the azimuthal angles of both points is below a pre-determined threshold. A set of expected points 358 may be identified as a candidate set 558 if there is more than a predetermined number (or threshold) number of matched points between the set of expected points 358 and the plurality of points representing the identified Kikuchi bands 354.

Also as with the point matching described with respect to FIG. 3A above various other criteria may be used when determining (or identifying) a match between the plurality points 356 representing the identified Kikuchi bands 354 and a set of expected points 358. For example, a candidate matching score (or goodness of fit measure) may be formed for the plurality points 356 representing the identified Kikuchi bands 354 and the set of expected points 358. Each match between a point representing the identified Kikuchi band 152 and an expected point may be weighted according to (or assigned a score based on) the difference in the azimuthal angles of both points. Additionally, or alternatively each match between a point representing the identified Kikuchi band 152 and an expected point may be weighted according to (or assigned a score based on) the intensity of one or both points. The candidate matching score may comprise a sum (or accumulation) of these weightings. In this way a set of expected points 358 may be identified as a candidate set 558 if the candidate matching score meets a pre-determined threshold value.

The matching module 340 is arranged to determine the configuration based on matching the plurality of points 356 representing the identified Kikuchi bands 354 with a number of sets of expected points, as set out above with respect to FIG. 3A, with the modification that only the candidate sets of expected points 558 identified by the candidate selection module 545 are considered. In this way, the candidate selection module 545 may be thought of as enabling a pre-filtering of the sets of expected points, and by extension the possible configurations. It will be appreciated that identifying such candidate sets 558 may advantageously increase the overall efficiency of the process of determining a configuration for the test sample 120, as sets of expected points 358 that do not match due to having incorrect azimuthal angles can be eliminated early on and not be subjected to a full point by point match.

The determination of candidate sets of points 558 may further be particularly advantageous as the candidate sets of expected points 558 are identified based on the azimuthal angles of the points. The azimuthal angles of the points representing the identified Kikuchi bands 354 and the expected points are invariant with respect to changes in the three components of the pattern centre, $PC_x$, $PC_y$, and $PC_z$ as discussed above. As such, errors in measurement (or estimation) of the pattern centre (or the point of incidence 117) should not affect the candidate sets identified. This is demonstrated as follows with reference to FIGS. 3B and 3C. The vector $n_{AB}$ is given by the cross product of the vector joining the origin and point A, and the vector joining the origin and point B.

$$n_{AB} = (A - O) \times (B - O)$$
$$n_{AB} = [a_x, a_y, -PC_z] \times [b_x, b_y, -PC_z]$$
$$n_{AB} = -PC_z \left[ (a_y - b_y), (b_x - a_x), \frac{b_x \cdot a_y - a_x \cdot b_y}{PC_z} \right]$$

The tangent of the azimuthal angle $\alpha$ is given by the ratio of the y and x components of the vector $n_{AB}$, such that the azimuthal angle $\alpha$ is given by the relation:

$$\alpha = \tan^{-1} \frac{(b_x - a_x)}{(a_y - b_y)}$$

As can be seen this is invariant with respect to changes in $PC_z$. A formula for the out-of-plane (or elevation) angle, $\beta$, can also be derived:

$$\beta = \tan^{-1} \left( \frac{b_x \cdot a_y - a_x \cdot b_y}{PC_z \cdot \sqrt{(b_x - a_x)^2 + (b_y - a_y)^2}} \right)$$

Because points A and B are in the plane of the image 150, the range of $ is constrained. Typically, in practice, $\beta$ rarely exceeds 60°. It will be appreciated that other mapping functions could also be used for $\beta$, for example:

$$\beta = \sin^{-1} \left( \frac{b_x \cdot a_y - a_x \cdot b_y}{PC_z \cdot \sqrt{(b_x - a_x)^2 + (b_y - a_y)^2}} \right)$$

or $$\beta = \frac{c_0}{PC_z} \left( \frac{b_x \cdot a_y - a_x \cdot b_y}{\sqrt{(b_x - a_x)^2 + (b_y - a_y)^2}} \right)$$

Here $c_0$ may be an angular scaling factor. Other mapping functions would be known to the skilled person and it will be appreciated that the invention is not necessarily limited to the The azimuthal angle $\alpha$ is also invariant to changes in $PC_x$ and $PC_y$. For example, if the pattern centre is shifted by $[\Delta x, \Delta y, \Delta z]$, this effectively changes the co-ordinates of points A and B relative to the shifted pattern centre (which is used as the origin of the x and y axes). The shifted points A and B now labelled as A' and B' respectively are given by:

$$A' = [(a_x - \Delta x), (a_y - \Delta y), -(PC_z + \Delta z)]$$

$$B' = [(b_x - \Delta x), (b_y - \Delta y), -(PC_z + \Delta z)]$$

Consequently, the vector $n_{AB}$ is given by:

$$n_{AB} = \pm(A' - O) \wedge (B' - O)$$

$$n_{AB} = \pm \begin{bmatrix} -(PC_z + \Delta z) \cdot ((a_y - \Delta y) - (b_y - \Delta y)), \\ -(PC_z + \Delta z) \cdot ((b_x - \Delta x) - (a_x - \Delta x)), \\ (a_x - \Delta x) \cdot (b_y - \Delta y) - (b_x - \Delta x) \cdot (y_A - \Delta y) \end{bmatrix}$$

$$\therefore n_{AB} \propto \pm \begin{bmatrix} (a_y - b_y), \\ (b_x - a_x), \\ ((a_x - \Delta x) \cdot (b_y - \Delta y) - (b_x - \Delta x) \cdot (a_y - \Delta y))/(PC_z + \Delta z) \end{bmatrix}$$

As can be seen, $\alpha$ is still given by:

$$\alpha = \tan^{-1}\left(\frac{(b_x - a_x)}{(a_y - b_y)}\right)$$

However, $\beta$ is dependent on changes in the Pattern Centre, as it is given by:

$$\beta = \tan^{-1}\left(\frac{((a_x - \Delta x) \cdot (b_y - \Delta y) - (b_x - \Delta x) \cdot (a_y - \Delta y))}{(PC_z + \Delta z) \cdot \sqrt{(b_x - a_x)^2 + (b_y - a_y)^2}}\right)$$

It will be appreciated that the Kikuchi band plane normal fitting algorithm can be split into two parts—the first one using a (insensitive to the Pattern Centre position), the second using both $\alpha$ and $\beta$. This reduces the overall sensitivity of the fitting algorithm with respect to Pattern Centre errors. Additionally, as shown in FIG. 8B described shortly below, any rotation of an EBSD image 150 around the pattern centre 155 should simply result in a constant azimuthal shift to all of the points representing the Kikuchi bands 152 in the EBSD image 150, as calculated using the system 300 and the system 500 above. It will be appreciated that the Kikuchi band normals can point in either direction. In some cases a wrap-around of the azimuthal angle (e.g. to force the angle to lie in the range of 0 to 180 degrees) can be accommodated by an inversion of the sign of $\beta$.

It will be appreciated therefore that sets of expected points 358 that differ only by a rotation of the respective EBSD images 150 about the pattern centre (and consequently are identical to within a constant shift of the azimuthal angle of the points) can be reduced to a single set of expected points 358. In this way it will be understood that in some variants of the system 300 and/or the system 500 described above the plurality of points 356 representing the identified Kikuchi bands 354 and a set of expected points 358 may be matched or compared based on the relative azimuthal angles of the respective points.

Similarly in some variants of the system 500 described above the candidate section module may be arranged to determine whether a set of expected points is a candidate set of expected points based on matching the relative azimuthal angles of the points in the set with the relative azimuthal angles of the points representing the identified Kikuchi bands 354.

It will be appreciated that the above discussion applies equally to the variants discussed above whether vectors (such as $n_{AB}$) are matched directly. As can be seen these can always be represented in a co-ordinate system where one component (in the example above the azimuthal angle) is invariant with respect to rotations about the pattern centre, and one component (in the example given above the elevation angle) is invariant to changes in $PC_X$ and $PC_Y$.

Figure 5B:
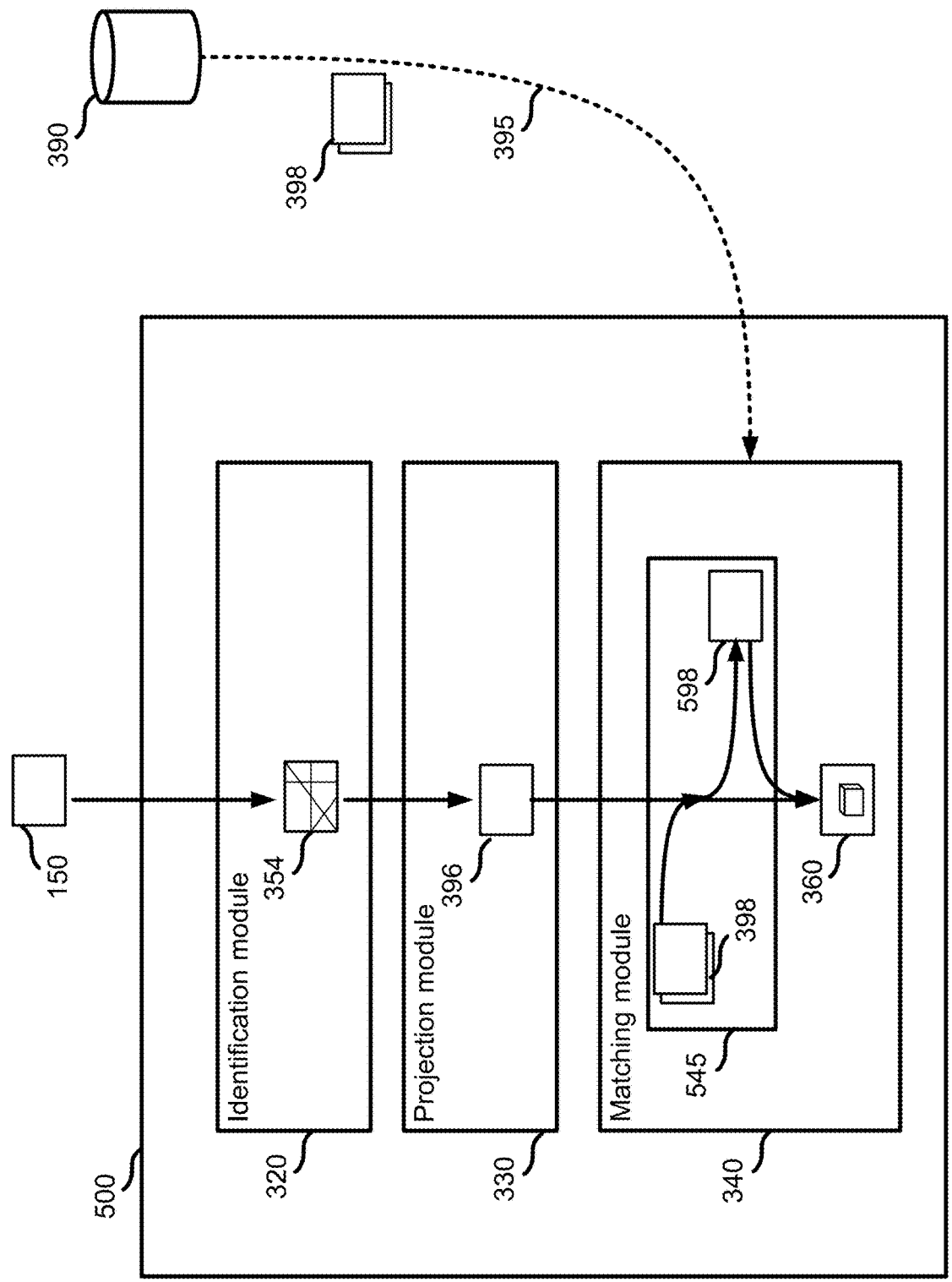
FIG. 5B schematically illustrates a variant of the EBSD image analysis system of FIG. 3D FIG. 6 schematically illustrates a method carried out by an EBSD image analysis system, such as the EBSD image analysis system of FIG. 5A.

FIG. 5B schematically illustrates a variant of the EBSD image 150 analysis system 300 discussed in relation to FIG. 3D above. The above discussion of the EBSD image 150 analysis system 500 with reference to FIG. 5A applies equally here with the following alterations.

The matching module 340 further comprises a candidate selection module 545. The candidate selection module 545 is arranged to identify (or determine) one or more candidate sets of expected vectors from the number of sets of expected vectors. In particular, the candidate section module 545 is arranged to determine whether a set of expected vectors 398 is a candidate set of expected vectors 598 based on matching the elevation angles of the vectors in the set 398 with the elevation angles of the vectors representing the identified Kikuchi bands 354. Here the elevation angle of the vector is the angle of the vector relative to a first pre-determined co-ordinate axis. In the examples discussed herein this axis is taken to be perpendicular to the image and run through the point of incidence. Additionally, or alternatively the candidate selection module may determine whether a set of expected vectors 398 is a candidate set of expected vectors 598 based on matching the azimuthal angles of the vectors in the set 398 with the azimuthal angles of the vectors representing the identified Kikuchi bands 354. Here the azimuthal angle may be considered to be the angle around the pre-determined co-ordinate axis. This may be considered to be equivalent to matching the azimuthal angles of the points discussed in other variants above. It will be appreciated that such matching of angles may be carried out based on pre-determined thresholds as discussed above in relation to FIG. 5A and the matching of the azimuthal angles of points.

In a similar manner to the point matching described with respect to FIG. 5A above a set of expected vectors 398 may be identified as a candidate set 598 if there is more than a predetermined number (or threshold) number of matched vectors between the set of expected vectors 398 and the plurality of vectors representing the identified Kikuchi bands 354.

Also as with the vector matching described with respect to FIG. 3D above various other criteria may be used when determining (or identifying) a match between the plurality vectors 396 representing the identified Kikuchi bands 354 and a set of expected vectors 398. For example, a candidate matching score (or goodness of fit measure) may be formed for the plurality vectors 396 representing the identified Kikuchi bands 354 and the set of expected vectors 398. Each match between a vectors representing the identified Kikuchi band 152 and an expected vector may be weighted according to (or assigned a score based on) the difference in the angle (or angles) of both vectors. Additionally, or alternatively each match between a vectors representing the identified Kikuchi band 152 and an expected vector may be weighted according to (or assigned a score based on) the intensity of the respective Kikuchi bands of one or both vectors. The candidate matching score may comprise a sum (or accumulation) of these weightings. In this way a set of expected vectors 398 may be identified as a candidate set 598 if the candidate matching score meets a pre-determined threshold value. It will be appreciated that the above matching will also provide a correspondence (or mapping) between respective vectors of the plurality of vectors and respective vectors in each candidate set of vectors. Such correspondence may further be used in determining a rotation that links the plurality of vectors with a given candidate set of vectors, as discussed above in relation to FIG. 3D.

The matching module 340 is arranged to determine the configuration based on matching the plurality of vectors 396 representing the identified Kikuchi bands 354 with a number of sets of expected vectors, as set out above with respect to FIG. 3D, with the modification that only the candidate sets of expected vectors 558 identified by the candidate selection module 545 are considered. In this way, the candidate selection module 545 may be thought of as enabling a pre-filtering of the sets of expected vectors, and by extension the possible configurations.

It will be appreciated that sets of expected vectors may be generated by applying a rotation to existing sets of expected vectors. As discussed above in relation to FIG. 3E for a given EBSD experiment (whether actual or simulated) changing the position of the screen 132 results in a rotation of the vectors representing the Kikuchi bands. As such, from a set of expected vectors further sets of expected vectors each relating to respective positions of the screen 132 may be generated by applying the appropriate respective rotation.

In a further variant therefor the sets of expected vectors may comprise one or more master sets of expected vectors each corresponding to a respective sample in a respective orientation, and for each master set of expected vectors a plurality of rotated sets of expected vectors. Each rotated set of expected vectors correspond to a master set of expected vectors having a respective rotation applied.

It will be understood that any generic rotation of a set of vectors may be equivalent to three sequential rotations about the co-ordinate axes. In particular a generic rotation of a vector v can be written as $v'=R_z(\varphi_1)R_x(\Phi)R_z(\varphi_2)v$ where $R_z(\varphi_2)$ is a rotation of angle $\varphi_2$ about a first axis (in this example Z), $R_x(\varphi)$ is a rotation of angle $\Phi$ about a second axis, and $R_z(\varphi_1)$ is a further rotation of angle $\varphi_1$ about the first axis. As such, in a co-ordinate system where one of the co-ordinates of the vector is the angle between the vector and the first axis the value of this co-ordinate will be invariant to the final rotation $R_z(\varphi_1)$ about the first axis. As such, it will be appreciated that it may be advantageous to determine the candidate sets of expected vectors by matching the elevation angle set out above when the sets of expected vectors comprise a number of rotated sets of master vectors as this matching is invariant with respect to one of the degrees of freedom of the general rotation.

As such, in the further variant each rotated set of expected vectors may be generated from the respective master set by by applying a respective rotation equivalent to applying rotation about the pre-determined co-ordinate axis followed by a rotation about a further co-ordinate axis. The number of rotated sets and the magnitudes of the rotation may be varied according to the precision of the matching and/or the desired sampling of the rotational space. Once the candidate sets are determined based on the elevation angle above, further candidate sets which differ from the identified candidate sets only by a rotation about the pre-determined axis may be included in the subsequent matching.

An example implantation is provided in the steps below to aid understanding.

For a given Kikuchi band pattern construct a set of vectors normal to the planes defined by the Kikuchi bands $n_i^*$. Each vector corresponds to a respective Kikuchi band and can be expressed in terms of an elevation angle $\beta$ and an azimuthal angle $\alpha$ For a plurality of potential samples calculate the most significant crystallographic reflections using, for example using kinematic simulation. Based on the simulated Kikuchi bands produce a set of expected vectors $n_i$ for each sample, each vector being normal to the plane defined by the respective Kikuchi band.

For each rotation by ($\phi$, $\varphi_2$) following a number of selected values for the rotation angles construct a set of rotated expected vectors for each set of expected vectors $$n_i^{j,k}=R_x(\Phi^k)R_z(\varphi_2^j)n_i$$

each vector of the rotated set $n_i^{j,k}$ can be expressed a pair of azimuthal and elevation angles ($\alpha_i^{j,k}$, $\beta_i^{j,k}$)

Search $\beta_i^{j,k}$ space for best match with detected $\beta_i^*$ angles. This gives a list of candidate sets $n_i^{j',k'}$.

Add to the candidate sets any sets related to the existing candidate sets by a third rotation $R_z(\varphi_2)$ again with selected values for the rotation angle:

$$n_i^{j,k',l''}R_z(\varphi_1^l)n_i^{j',k'}$$

Search $\alpha_i^{j,k',l''}$ space for best match with detected $\alpha_i^*$ angles using only candidates from previous step.

Validate solution in case of multiple candidates from previous step Optimize ($\varphi_1$, $\phi$, $\varphi_2$) angles for required precision.

In order to aid understanding a further more detailed worked example is provided below. It will be appreciated that the values given in this worked example are not intended to be limiting and are instead merely illustrative.

An initial set of e.g. 40 precalculated expected vectors $n_i$ are considered, each corresponding to individual reflector planes for a given crystal.

Starting with the elevation angles $\beta_i^{j,k}$ the rotation space of $\phi$, $\varphi_2$ may be sampled to obtain e.g. 32,400 points. Values of $\beta_i^{j,k}$ can be quantized to e.g. 120 bins with a 1° step as $\beta$ typically spans only +−60°. A null bit array of 120×32,400 points is then created.

The 40 precalculated expected vectors $n_i$ vectors are then rotated for every 32,400 points of ($\phi$, $\varphi_2$) values. For every such rotation 40 $\beta^{j,k}$ angles are therefore calculated and the bit field incremented accordingly, i.e. a bit value (typically 1) is stored in a position defined by $\beta$ and ($\phi$, $\varphi_2$) values.

Assuming there are 8 measured Kikuchi bands 8 $n_i^*$ vectors may then be obtained each having a corresponding $\beta_i^*$ angle. Eight 32,400 bit long vectors may now be selected depending on $\beta_i^*$ value. These vectors are pre-filled with 1s for ($\phi$, $\varphi_2$) values which may correspond to the measured orientation.

By summing all eight 32,400 bit long vectors and identifying points with a value greater than a predetermined threshold (which indicates the number of matched vectors in a given rotation) a number of candidate ($\phi$, $\varphi_2$) values may be identified.

The process may then be repeated sampling $\varphi_1$ rotation space considering only the angles $\alpha_i^*$ as $\beta_i^*$ are invariant under such rotations. Moreover, only the candidate ($\phi$, $\varphi_2$) values from the previous step now need to be considered. In this way a final candidate (or candidates) for ($\varphi_1$, $\phi$, $\varphi_2$) may be identified.

Figure 6:
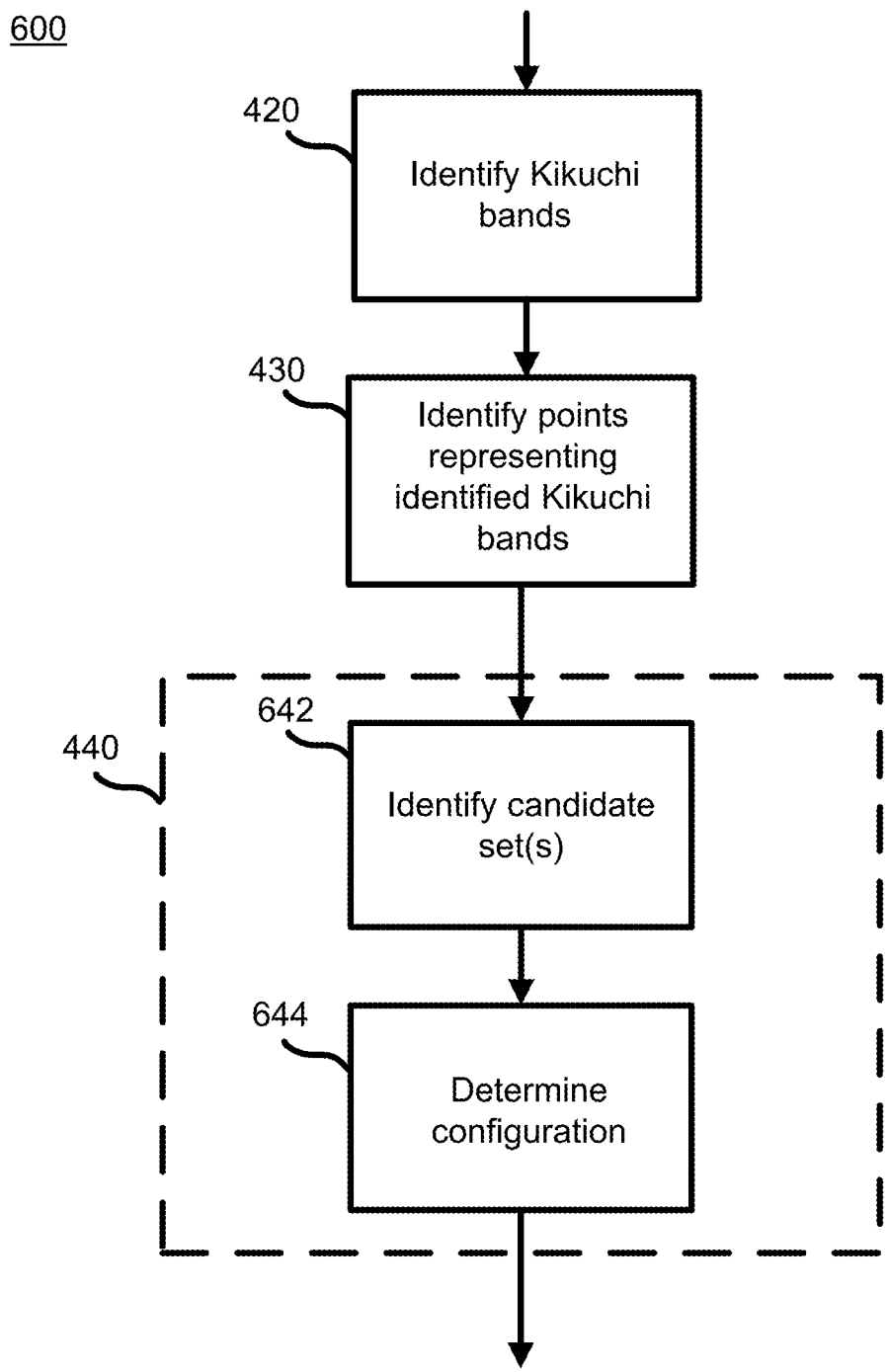

FIG. 6 schematically illustrates a method 600 carried out by a variant EBSD image 150 analysis system, such as the variant EBSD image 150 analysis system 500 of FIG. 5. The method 600 is a variant of the method 400 discussed above. The above discussion of the method 400 with reference to FIG. 4A applies equally here with the following alterations.

The step 440 comprises a step 642. At the step 642 one or more candidate sets of expected points are identified from the number of sets of expected points. The step 642 comprises determining whether a set of expected points 358 is a candidate set of expected points 558 based on matching the azimuthal angles of the points in the set 358 with the azimuthal angles of the points representing the identified Kikuchi bands 354. The step 642 may comprise determining that a point in the plurality of points representing the identified Kikuchi bands 354 matches (or corresponds to) a point in the set of expected points 358 if the difference in the azimuthal angles of both points is below a pre-determined threshold. The step 642 may comprise determining that a set of expected points 358 is identified as a candidate set 558 if there is more than a predetermined number (or threshold) number of matched points between the set of expected points 358 and the plurality of points representing the identified Kikuchi bands 354. As discussed above in relation to FIG. 5A it will be appreciated that various other criteria may be used when determining (or identifying) a match between the plurality points 356 representing the identified Kikuchi bands 354 and a set of expected points 358.

Additionally, the step 642 may comprise forming (or calculating) a candidate matching score (or goodness of fit measure) for the plurality points 356 representing the identified Kikuchi bands 354 and the set of expected points 358, as discussed above.

The step 440 comprises a step 644. The discussion of the step 440 above in relation to FIG. 4A applies equally to step 644 with the modification that only the candidate sets of expected points 558 identified by the candidate selection module 545 are considered. As such the step 644 comprises identifying one or more sets of candidate expected points 558 that match the plurality of points 356 representing the identified Kikuchi bands 354. The step 644 also comprises to determining the configuration based on said matching In this way, the step 642 may be thought of pre-filtering the sets of expected points, and by extension the possible configurations.

Figure 7A:
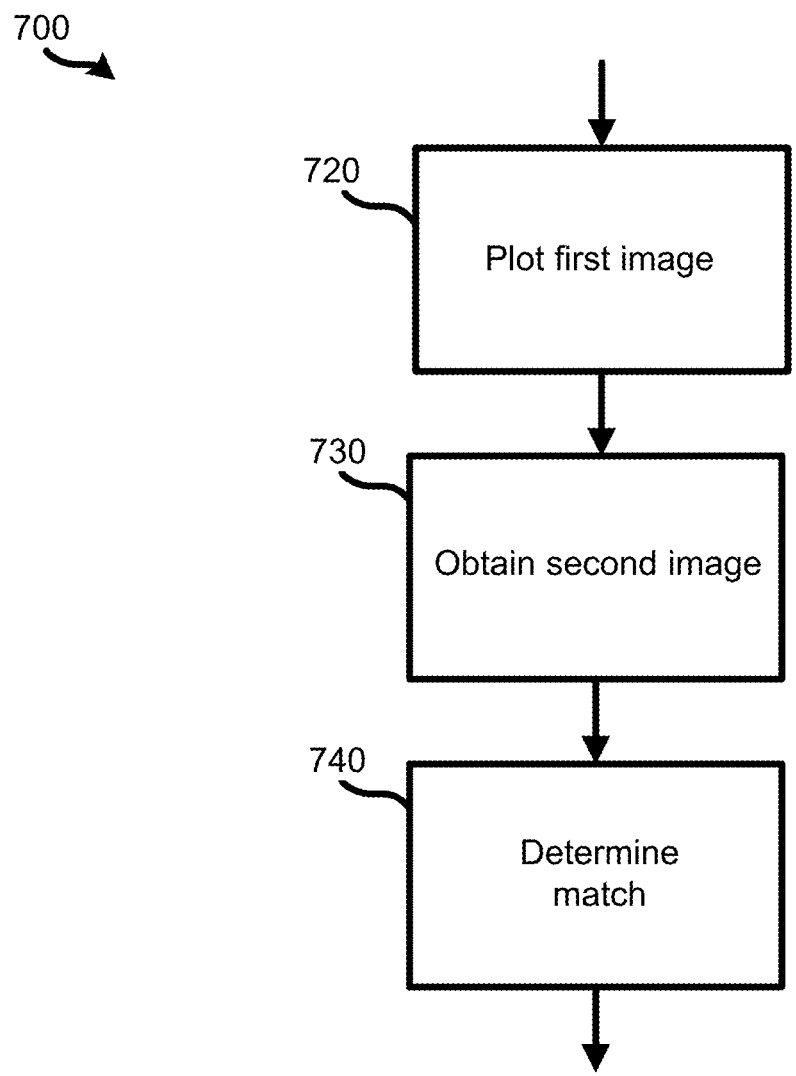
FIG. 7A schematically illustrates a method of matching points representing Kikuchi bands using Kikuchi band maps, such as may be carried out by the EBSD image analysis systems of FIG. 3A or FIG. 5A.

FIG. 7A schematically illustrates a method 700 of matching points representing Kikuchi bands 152 using Kikuchi band 152 maps, such as may be carried out by the EBSD image 150 analysis systems of FIG. 3A or FIG. 5. In particular the method 700 may be used in the step 440 of the method 400 described in FIG. 4A for identifying if a set of expected points 358 matches the plurality of points 356 representing the identified Kikuchi bands 354. Similarly, the method 700 may be used in the step 644 of the method 600 described in FIG. 6 for identifying if a candidate set of expected points 558 matches the plurality of points 356 representing the identified Kikuchi bands 354.

In a step 720 a first image (or map) is plotted for the plurality of points of the plurality of identified Kikuchi bands 152. For each point of the plurality of points of the plurality of identified Kikuchi bands 152 a distribution centered on that point may be plotted (or included) in the first image. In this way it will be understood that the first image usually comprises an array of pixels, such as a bitmap image (or raster image, or array), permitting distributions to be plotted as varying pixel value (or intensity). Of course, it will be appreciated that any suitable image or array representation may be used. For a given point the distribution may be based on (or represent, or be calculated in dependence on) an expected error or confidence interval on the position of the point. For example a characteristic width of the distribution may be (or be proportional to) one or more standard errors of the point. Additionally, or alternatively the distribution may be based on (or represent, or be calculated in dependence on) the intensity and/or the band width of the identified Kikuchi band 152 corresponding to the point. For example a characteristic width of the distribution may be (or be proportional to) the band width of the identified Kikuchi band 152 corresponding to the point. The maximum value (or height) of the distribution may be (or be proportional to) the intensity of the identified Kikuchi band 152 corresponding to the point. Additionally, or alternatively, Kikuchi bands that are not expected to be present may be given (or assigned) negative intensity values. This may be advantageous for resolving pseudosymmetric mis-indexing problems, for example in trigonal Quartz patterns.

In a step 730 a second image (or map) is obtained for a given set of expected points. In a similar manner to the first image, for each point of the given set of expected points a distribution centered on that point may be plotted (or included) in the second image. In this way it will be understood that the second image usually comprises an array of pixels, such as bitmap (or raster) image, permitting distributions to be plotted as varying pixel value (or intensity). Of course, it will be appreciated that any suitable image or array representation may be used, or that the data may be held as discrete points. For a given point the distribution may be based on (or represent, or be calculated in dependence on) an expected error or confidence interval on the position of the point. For example a characteristic width of the distribution may be (or be proportional to) one or more standard errors of the point. Additionally, or alternatively the distribution may be based on (or represent, or be calculated in dependence on) the intensity and/or the band width of the Kikuchi band 152 corresponding to the point. For example a characteristic width of the distribution may be (or be proportional to) the band width of the identified Kikuchi band 152 corresponding to the point. The maximum value (or height) of the distribution may be (or be proportional to) the intensity of the identified Kikuchi band 152 corresponding to the point.

It will be appreciated that in the above described step 730 the second image may be plotted directly by the matching module 340 as part of the method 700. Equally, it will be appreciated that the second image may be pre-plotted (or pre-calculated) by a separate system, in a similar manner to the pre-calculation of the sets of expected points described previously. For example, for a set of expected points the corresponding second image may be pre-calculated and stored in a storage such as the storage medium 204, and/or in the device 222. It will be appreciated that the second image may be stored remote to the system 300, such as on a server and/or cloud computing platform 390. As such, the step 730 may comprise the matching module 340 retrieving the second image from a server and/or cloud computing platform via a suitable data connection 395. Examples of suitable data connections include, via a local area network, via a wide area network, via a direct data connection (such as a USB connection, a Thunderbolt connection, a Firewire connection, a direct Ethernet connection, etc.), via the Internet, and so on.

At a step 740 it is determined whether plurality of points of the plurality of identified Kikuchi bands 152 and the given set of expected points match. In the step 740 match between the particular set of expected points and the plurality of points of the identified Kikuchi bands 354 is determined based on the intersection (or overlap) of the first and second images. The intersection of the first and second images may be calculated (or determined or formed) by combining pixels or elements of the first image with corresponding pixels or elements of the second image. In this way a further image may be formed which comprises the overlap between the distributions in the first image and the distributions in the second image. The multiplication operator and/or a binary AND operator may be used to combine the elements of the first image and the second image. Additionally, or alternatively, the image or images could be binarised by use of suitable threshold values and the first and second image elements only combined for these thresholded regions. These matching processes are well known in image processing and not described further herein. The step 740 may comprise calculating an overall matching score (as discussed previously) for the plurality of points of the plurality of identified Kikuchi bands 152 and the given set of expected points. The overall matching score typically comprises (or is based on) a combination (such as the sum) of the elements of the intersection of the first and second images. In this way it will be appreciated that the overall matching score may be equivalent to that obtained by summing the overlap of distributions centered on the respective points, as discussed previously. Usually, a match between plurality of points of the plurality of identified Kikuchi bands 152 and the given set of expected points is identified (or determined) if the overall score reaches a pre-determined threshold. Alternatively a match between plurality of points of the plurality of identified Kikuchi bands 152 and the given set of expected points may be identified only for the set of expected points with the highest overall score.

In the above described step 740 calculating the intersection between the first and second images, and calculating the overall matching score based on the intersection are described as separate sub-steps. It will be appreciated however that these sub-steps may be combined such that the calculation of the overall matching score is performed in tandem with the calculating of the intersection between the first and second images. As such, in some examples the full intersection between the first and second images may not be explicitly produced at any point.

It will be appreciated that a different distribution may be used for plotting the plurality of points of the plurality of identified Kikuchi bands 152 in the step 720 than the distribution used in the plot of the set of expected points 358 in the step 730. In some cases the plurality of points of the plurality of identified Kikuchi bands 152 or the set of expected points 358 may be plotted as a simple point (such as that produced by a Dirac delta distribution).

Figure 7B:
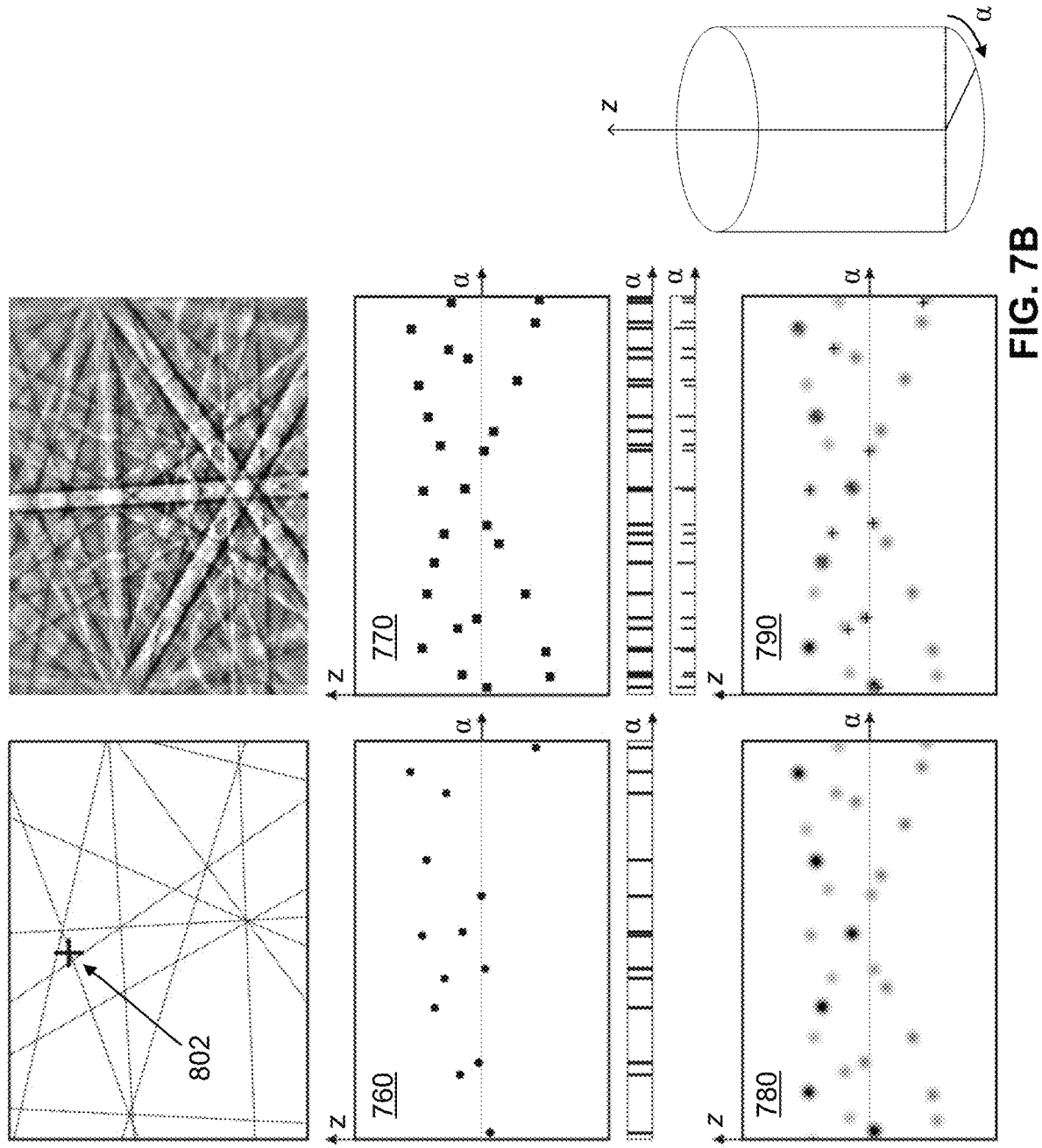
FIG. 7B shows examples of Kikuchi band maps such as may be used with the method outlined in FIG. 7A.

FIG. 7B shows an example images (or maps) such as those that may be produced by the method 700 of FIG. 7A. In FIG. 7B there is shown an example first image 760 (corresponding to the first image described above in relation to the step 720), an example second image 770 (corresponding to the first image described above in relation to the step 730), and a plot of the intersection 780 of the example first image 760 and the example second image 770 (such as that which may be produced in the step 740 above).

The example first image 760 shows the points of the plurality of identified Kikuchi bands 152 from an EBSD image 150 of silicon. As can be seen the axes of the first image 760 correspond to the cylindrical co-ordinates of the cylindrical surface used in the determination of the points. Also shown is the cylindrical surface 799 to provide a reference. The points in the first image 760 have been plotted as Gaussian functions in a greyscale bitmap.

The example second image 770 shows the points of a set of expected points corresponding to silicon. As with the first image 760 the axes of the second image 770 correspond to the cylindrical co-ordinates of the cylindrical surface used in the determination of the points of the plurality of identified Kikuchi bands 152. The points in the second image 770 have been plotted as Gaussian functions in a greyscale bitmap.

The Gaussians used may be asymmetric horizontally and/or vertically. In this particular example a 2 degree Gaussian spread was used for both axes.

The plot of the intersection 780 shows the intersection between the example first image 760 and the example second image 770. As can be seen some points from the example second image 770 were missing from the first image 760 so they appear as dark regions in the intersection 780. For the points in the two example images 760; 770 that overlap bright region are present showing the extent of the overlap.

Figure 8A:
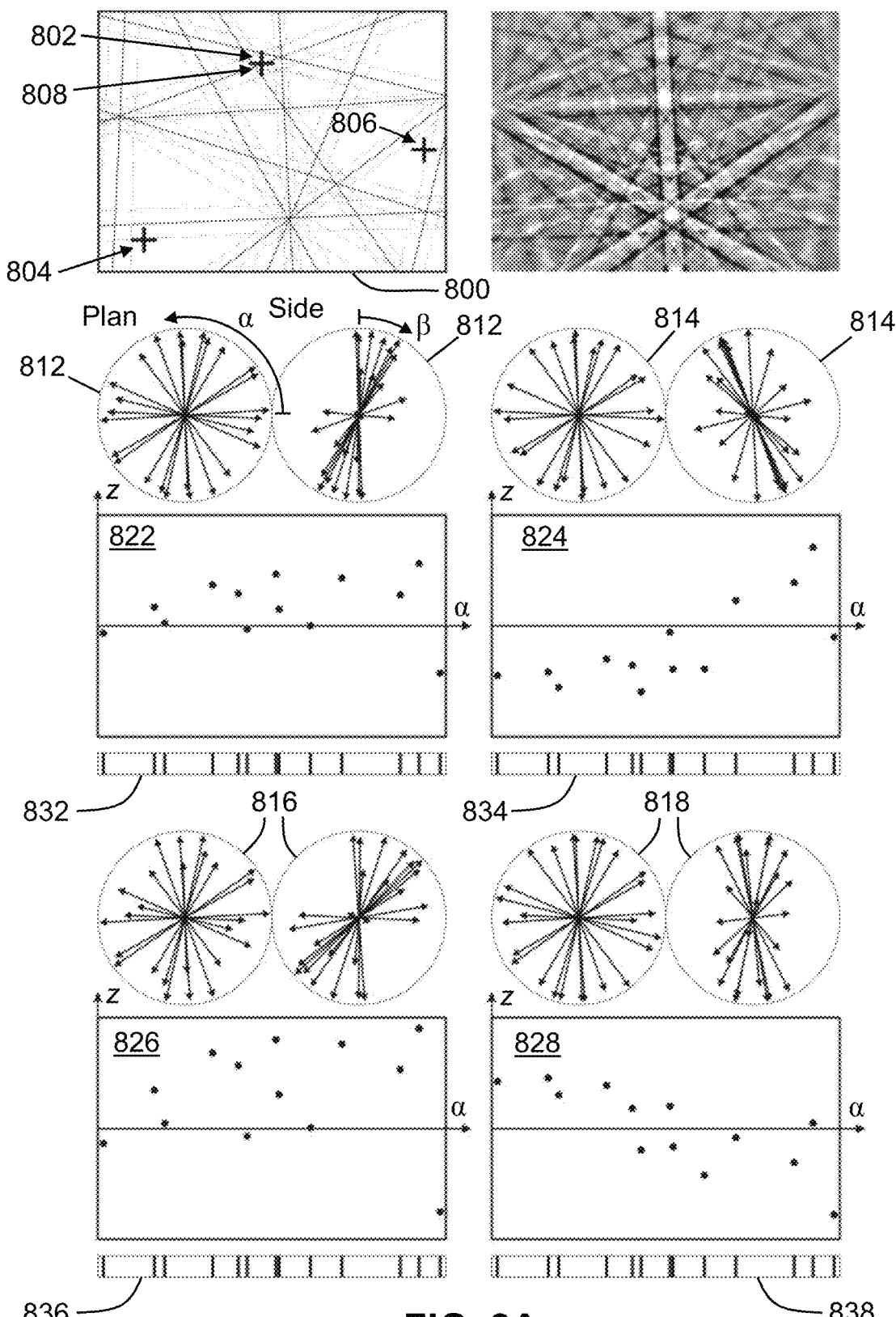
FIG. 8A shows an example EBSD image and the effect that changes in the pattern centre has on a vector representation of the Kikuchi bands.

FIG. 8A shows an example 800 of an EBSD image 150 as described above and the effect that changes in the pattern centre 155 has on the vector representation of the Kikuchi bands 152 set out previously. There is shown an EBSD image 800. The description of the example EBSD image 150 above applies equally to this EBSD image 800. The Kikuchi bands 152 present in the image 800 have been identified, such as by use of the identification module 320 described previously. The identified Kikuchi bands 354 are shown in the EBSD image 800 as the overlaid solid lines. Also shown are corresponding dotted lines indicating the band widths of the corresponding Kikuchi bands 152. These band widths have been identified, such as by use of the identification module 320 described previously. Shown in the EBSD image 800 are four estimated pattern centres 802; 804; 806; 808 for the EBSD image 800. The pattern centre 802 represents the true pattern centre for the image. The other pattern centres 804; 806; 808 are incorrect pattern centres. The fourth pattern centre 808 is shown overlaid with the third pattern centre 806 as these two pattern centres differ only in the component $PC_z$. These other pattern centres 804; 806; 808 have been deliberately chosen to be very different from the true pattern centre to provide a clear illustration of the effect of errors in the pattern centre. Typically, errors in estimation or measurement of the pattern centre are less than that shown in FIG. 8A, and are generally of the order of a few percent. It has been observed that subsequent indexing is usually more sensitive to errors in $PC_x$ and $PC_y$ than in $PC_z$.

FIG. 8A shows are four spherical volumes 812; 814; 816; 818 each corresponding to a respective pattern centre 802; 804; 806; 808. Each spherical volume is shown with a plan view and a side view.

The first spherical volume corresponds to the true pattern centre 802. The first spherical volume shows the vector representations of the identified Kikuchi bands 354 calculated, as discussed previously in relation to the projection module 340, based on the true pattern centre 802. In particular, in this example, each vector representation is a vector, normal to the plane defined by the respective Kikuchi band 152, passing through the estimated point of incidence 117 (as defined by the pattern centre 802). The second spherical volume 814 is the same as the first spherical volume 812 with the difference that the second pattern centre 804 is used in place of the true pattern centre. The third spherical volume 816 is the same as the first spherical volume 812 with the difference that the third pattern centre 806 is used in place of the true pattern centre. Similarly, the fourth spherical volume 818 is the same as the first spherical volume 812 with the difference that the fourth pattern centre 808 is used in place of the true pattern centre. As can be seen across the four spherical volumes 812; 814; 816; 818 errors in the estimation of the pattern centre appear to result in changes to the vector representations of the identified Kikuchi bands 354.

Also shown in FIG. 8A are four plots 822; 824; 826; 828 each corresponding to a respective pattern centre 802; 804; 806; 808. The first plot corresponds to the true pattern centre 802. The first plot shows a number of points each representing a respective identified Kikuchi band 152. In particular, each point in the first plot is the point of intersection between the cylindrical surface and the vector representation of the respective Kikuchi band 152, as discussed previously in relation to the projection module 340. In effect the first plot may be thought of as the unwrapped or flattened cylindrical surface. As such the horizontal axis of the first plot corresponds to the azimuthal angle of the cylindrical surface. The second plot 824 is the same as the first plot 822 with the difference that the second pattern centre 804 is used in place of the true pattern centre. The third plot 816 is the same as the first plot 812 with the difference that the third pattern centre 806 is used in place of the true pattern centre. Similarly the fourth plot 818 is the same as the first plot 812 with the difference that the fourth pattern centre 808 is used in place of the true pattern centre. As can be seen across the four plots 822; 824; 826; 828 whilst errors in the estimation of the pattern centre change the relative vertical positions of the points in the plots 822; 824; 826; 828, the azimuthal angle (or horizontal position) of the points remains unchanged. This can be seen in four strips 832; 834; 836; 838 that are also shown. Each strip corresponds to a respective plot 822; 824; 826; 838. A strip 832; 834; 836; 838 simply shows a line, for each point in the corresponding plot 822; 824; 826; 828, at the azimuthal angle of that point. As can be seen the strips 832; 834; 836; 838 are identical.

FIG. 8B shows an example 800 of an EBSD image 150 as described above and the effect that rotation of the image 150 about the pattern centre 802 has on the vector representation of the Kikuchi bands 152 set out previously. FIG. 8B shows the EBSD image 800, the pattern centre 802, the corresponding plot 822 and the corresponding strip 832 as described above in relation to FIG. 8A.

FIG. 8B also shows a rotated image 800' which corresponds to the image 800 rotated about the pattern centre 802. The plot 800 is shown relative to the rotated image 800' by the dotted rectangle. There is also a plot 822' which corresponds to the rotated image 800' and shows a number of points each representing a respective identified Kikuchi band 152. Again, the plot 822 corresponding to the image 800 is shown relative to the plot 822' by the dotted rectangle. As can be seen the two right most points of the plot 822 corresponding to the image 800 have been wrapped around to the left hand side of the plot 822' corresponding to the rotated image 800'. A strip 832' corresponding to the rotated image 800' is also shown, which itself shows the same wraparound.

As can be seen from FIG. 8B the relative positions of the points in the plot 822 and the plot 822' remain unchanged and the effect of the rotation is to apply a constant azimuthal shift to the points.

Modifications

It will be appreciated that the methods described have been shown as individual steps carried out in a specific order. However, the skilled person will appreciate that these steps may be combined or carried out in a different order whilst still achieving the desired result.

For ease of understanding in the above discussion systems and methods where the matching occurs by directly matching sets of vectors has been described separately from matching where projected points are matched. However, it will be appreciated that the matching described with respect to the sets of points also achieves matches between sets of vectors, in view of the correspondence between individual sets of points and individual sets of vectors.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may be implemented together by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), a solid state drive, an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Example methods and systems are set out in the following paragraphs (NPs):

NP 1. A method of analyzing a sample imaged by electron backscatter diffraction, the method comprising:
  identifying a plurality of Kikuchi bands in an electron backscatter diffraction image of a position on the sample;
  forming, for each identified Kikuchi band, a respective point corresponding to the intersection between: a vector representation of said Kikuchi band, and a cylindrically symmetrical surface, wherein the vector representation of said Kikuchi band and the cylindrical axis of the surface are both determined based at least in part on an estimate of the position on the sample; and determining a configuration of the sample by identifying a particular set of expected points from a plurality of sets of expected points as matching the points of the plurality of identified Kikuchi bands.

NP 2. The method according to NP 1 further comprising:
obtaining the plurality of sets of expected points, each set of expected points corresponding to a respective known sample, wherein for each known sample the expected points correspond to intersections between vector representations of Kikuchi bands of said known sample and a cylindrically symmetrical surface,
wherein the determined configuration is based on one or more properties of a particular known sample corresponding to the particular set of expected points matched with the points of the plurality of identified Kikuchi bands.

NP 3. The method according to NP 2 to wherein the Kikuchi bands of one or more of the known samples are identified from simulated EBSD images.

NP 4. The method according to NP 2 or 3 wherein the Kikuchi bands of one or more of the known samples are identified from experimental EBSD images.

NP 5. The method according to any preceding NP wherein, for each Kikuchi band, the vector representation of the respective Kikuchi band is determined based on a plane defined by the Kikuchi band.

NP 6. The method according to NP 5 wherein, for each Kikuchi band, the vector representation of the respective Kikuchi band is based on a normal vector of the plane defined by the Kikuchi band.

NP 7. The method according to any preceding NP wherein determining a configuration further comprises:
obtaining a number of candidate sets of expected points from the plurality of sets of expected points by matching the relative azimuthal angles of the points with the relative azimuthal angles of the expected points,
wherein the particular set of expected points that matches the points of the plurality of identified Kikuchi bands is identified from the number of candidate sets of expected points.

NP 8. The method according to any preceding NP wherein determining a configuration further comprises:
for each of two or more sets of expected points from the plurality of sets of expected points, optimizing the estimate of the position on the sample based on said set of expected points; and
identifying one of the two or more sets of expected points as the particular set of expected points based at least in part on the optimized estimates of the position on the sample.

NP 9. The method according to any preceding NP wherein a point is matched with an expected point when an overlap calculated between a distribution centered on the point with a distribution centered on the expected point exceeds a pre-determined threshold.

NP 10. The method according to any one of NPs 1-8, wherein identifying a particular set of expected points from a plurality of sets of expected points as matching the points of the plurality of identified Kikuchi bands comprises:
plotting, in a first image, distributions centered on each point of the points of the plurality of identified Kikuchi bands; and
obtaining a second image comprising, for each point of the particular set of expected points, a distribution centered on said point;
wherein a particular set of expected points from a plurality of sets of expected points is identified as matching the points of the plurality of identified Kikuchi bands based on the intersection of the first and second images.

NP 11. The method according to NP 9 or 10, wherein the characteristic widths of the distributions are based on the intensities of the corresponding points.

NP 12. The method according to any one of NPs 9-11 wherein at least one of the distributions is a Gaussian distribution.

NP 13. The method of any preceding NPs wherein the determined configuration comprises any one or more of:
a crystalline phase in the sample;
the unit cell dimensions of a crystal in the sample;
the atoms in the cell of a crystal in the sample;
a lattice orientation in the sample; and
a local lattice deformation present in the sample; strain state.

NP 14. An apparatus arranged to carry out a method according to any one of NPs 1 to 13.

NP 15. A computer-readable medium storing a computer program which, when executed by a processor, causes the processor to carry out a method according to any one of NPs 1 to 13.

The invention claimed is:

1. A method of analyzing a sample imaged by electron backscatter diffraction, the method comprising:
identifying a plurality of Kikuchi bands in an electron backscatter diffraction image of a position on the sample;
forming, for each identified Kikuchi band, a respective vector representation of said Kikuchi band based at least in part on an estimate of the position on the sample;
determining a configuration of the sample by identifying a particular set of expected vector representations from a plurality of sets of expected vector representations as matching the vector representations of the plurality of identified Kikuchi bands; and
forming, for each identified Kikuchi band, a respective point corresponding to the intersection between: the vector representation of said Kikuchi band, and a cylindrically symmetrical surface, wherein the cylindrical axis of the surface is determined based at least in part on an estimate of the position on the sample,
wherein said identifying a particular set of expected vector representations from a plurality of sets of vector representations as matching the vector representations of the plurality of identified Kikuchi bands comprises matching the expected set of points corresponding to the particular set of expected vector representations with the points of the plurality of identified Kikuchi bands,
wherein a point of the plurality of identified Kikuchi bands is matched with an expected point when an overlap calculated between a distribution centered on the point of the plurality of identified Kikuchi bands and a distribution centered on the expected point exceeds a pre-determined threshold, wherein at least one of the distributions is a Gaussian distribution.

2. The method according to claim 1 wherein determining a configuration further comprises:
obtaining a number of candidate sets of expected vector representations from the plurality of sets of expected vector representations by matching the angles of the vector representations, relative to a pre-determined co-ordinate axis, with the corresponding angles of the expected vector representations,
wherein the particular set of expected vector representations that matches the vector representations of the plurality of identified Kikuchi bands is identified from the number of candidate sets of expected vector representations.

3. The method according to claim 2 wherein obtaining a number of candidate sets of expected vector representations further comprises:
matching the relative angles of the vector representations around the pre-determined co-ordinate axis with the relative angles of the expected vector representations around the pre-determined co-ordinate axis.

4. The method according to claim 2 wherein the plurality of expected sets of vector representations comprise one or more master sets of vector representations, and wherein for each master set of vector representations the plurality of expected sets vector representations comprise one or more rotated sets of expected vectors generated by applying a respective rotation equivalent to applying rotation about the pre-determined co-ordinate axis followed by a rotation about a further co-ordinate axis.

5. The method according to claim 1 wherein said determining comprises identifying a rotation which matches the particular set of expected vector representations with the vector representations of the plurality of identified Kikuchi bands.

6. The method according to claim 1 wherein determining a configuration further comprises:
for each of two or more sets of expected points from the plurality of sets of expected points, optimizing the estimate of the position on the sample based on said set of expected points;
identifying one of the two or more sets of expected points as the particular set of expected points based at least in part on the optimized estimates of the position on the sample.

7. The method according to claim 1, wherein identifying a particular set of expected points from a plurality of sets of expected points as matching the points of the plurality of identified Kikuchi bands comprises:
plotting, in a first image, distributions centered on each point of the points of the plurality of identified Kikuchi bands;
obtaining a second image comprising, for each point of the particular set of expected points, a distribution centered on said point;
wherein a particular set of expected points from a plurality of sets of expected points is identified as matching the points of the plurality of identified Kikuchi bands based on the intersection of the first and second images.

8. The method according to claim 1, wherein the characteristic widths of the distributions are based on the intensities of the corresponding points.

9. The method according to claim 1, further comprising:
obtaining the plurality of sets of expected vector representations, each set of expected vector representations corresponding to a respective known sample, wherein for each known sample the expected vector representations correspond to vector representations of Kikuchi bands of said known sample,
wherein the determined configuration is based on one or more properties of a particular known sample corresponding to the particular set of expected vector representations matched with the vector representations of the plurality of identified Kikuchi bands.

10. The method according to claim 9 to wherein the Kikuchi bands of one or more of the known samples are identified from simulated EBSD images.

11. The method according to claim 9 wherein the Kikuchi bands of one or more of the known samples are identified from experimental EBSD images.

12. The method according to claim 1, wherein, for each Kikuchi band, the vector representation of the respective Kikuchi band is determined based on a plane defined by the Kikuchi band.

13. The method according to claim 12 wherein, for each Kikuchi band, the vector representation of the respective Kikuchi band is based on a normal vector of the plane defined by the Kikuchi band.

14. The method according to claim 1, wherein determining a configuration further comprises:
for each of two or more sets of expected vector representations from the plurality of sets of expected vector representations, optimizing the estimate of the position on the sample based on said set of expected vector representations; and
identifying one of the two or more sets of expected vector representations as the particular set of expected vector representations based at least in part on the optimized estimates of the position on the sample.

15. The method of claim 1, wherein the determined configuration comprises any one or more of the group consisting of:
a crystalline phase in the sample;
the unit cell dimensions of a crystal in the sample;
the atoms in the cell of a crystal in the sample;
a lattice orientation in the sample; and
a local lattice deformation present in the sample; strain state.

16. A method of analyzing a sample imaged by electron backscatter diffraction, the method comprising:
identifying a plurality of Kikuchi bands in an electron backscatter diffraction image of a position on the sample;
forming, for each identified Kikuchi band, a respective vector representation of said Kikuchi band based at least in part on an estimate of the position on the sample;
obtaining a plurality of sets of expected vector representations, each set of expected vector representations corresponding to a respective already known sample having a known configuration, wherein, for each already known sample, the expected vector representations correspond to vector representations of Kikuchi bands of said already known sample; and
determining a configuration of the sample by identifying a particular set of expected vector representations from the plurality of sets of expected vector representations as matching the vector representations of the plurality of identified Kikuchi bands,
wherein the determined configuration is based on one or more properties of a particular already known sample corresponding to the particular set of expected vector representations matched with the vector representations of the plurality of identified Kikuchi bands.

17. The method according to claim 16, wherein the plurality of expected sets of vector representations comprise one or more master sets of vector representations, and wherein for each master set of vector representations the plurality of expected sets vector representations comprise one or more rotated sets of expected vectors generated by applying a respective rotation equivalent to applying rotation about the pre-determined co-ordinate axis followed by a rotation about a further co-ordinate axis.

18. The method according to claim 16, wherein said determining comprises identifying a rotation which matches the particular set of expected vector representations with the vector representations of the plurality of identified Kikuchi bands.

19. The method according to claim 16, further comprising:
   forming, for each identified Kikuchi band, a respective point corresponding to the intersection between: the vector representation of said Kikuchi band, and a cylindrically symmetrical surface, wherein the cylindrical axis of the surface is determined based at least in part on an estimate of the position on the sample;
   wherein said identifying a particular set of expected vector representations from the plurality of sets of vector representations as matching the vector representations of the plurality of identified Kikuchi bands comprises matching the expected set of points corresponding to the particular set of expected vector representations with the points of the plurality of identified Kikuchi bands.

20. The method according to claim 19, wherein a point is matched with an expected point when an overlap calculated between a distribution centered on the point with a distribution centered on the expected point exceeds a pre-determined threshold.

* * * * *

UNITED STATES PATENT AND TRADEMARK OFFICE
CERTIFICATE OF CORRECTION

PATENT NO. : 12,099,024 B2  
APPLICATION NO. : 17/427791  
DATED : September 24, 2024  
INVENTOR(S) : Austin Penrose Day et al.

Page 1 of 1

It is certified that error appears in the above-identified patent and that said Letters Patent is hereby corrected as shown below:

In the Claims

In Column 35, Claim 4, Line 21, delete "sets vector" and insert -- sets of vector --, therefor.

In Column 36, Claim 10, Line 3, delete "to wherein" and insert -- wherein --, therefor.

In Column 36, Claim 15, Line 28, delete "method of" and insert -- method according to --, therefor.

In Column 36, Claim 17, Line 67, delete "sets vector" and insert -- sets of vector --, therefor.

Signed and Sealed this  
Twenty-fifth Day of March, 2025

Coke Morgan Stewart  
*Acting Director of the United States Patent and Trademark Office*